(12) United States Patent
Gaydos et al.

(10) Patent No.: US 6,227,124 B1
(45) Date of Patent: May 8, 2001

(54) LOCKING MECHANISM FOR A HINGED RAILROAD HOPPER CAR DOOR

(75) Inventors: Christopher C. Gaydos, St. Charles; Adam A. Huppert, Montgomery; Jeffrey J. Carter, Oswego; Guadalupe L. Galvan, DeKalb, all of IL (US)

(73) Assignee: Miner Enterprises, Inc., Geneva, IL (US)

( * ) Notice: Subject to any disclaimer, the term of this patent is extended or adjusted under 35 U.S.C. 154(b) by 0 days.

(21) Appl. No.: 09/372,562

(22) Filed: Aug. 11, 1999

(51) Int. Cl.$^7$ ................................................. B61D 3/00
(52) U.S. Cl. .................................... 105/286; 105/308.1
(58) Field of Search .................................. 105/247, 286, 105/306, 308.1, 311.1

(56) References Cited

U.S. PATENT DOCUMENTS

| | | |
|---|---|---|
| 2,588,219 | 4/1952 | Dorey . |
| 2,641,198 | 6/1953 | Zimmer et al. . |
| 3,139,042 | 6/1964 | Floehr . |
| 3,391,653 | 7/1968 | DeRidder . |
| 3,712,248 | * 1/1973 | Floehr .............................. 105/253 |
| 3,951,077 | 4/1976 | Miller . |
| 4,213,725 | 7/1980 | Knippel ............................ 414/387 |
| 4,278,382 | 7/1981 | Knippel ............................ 414/388 |
| 4,280,778 | 7/1981 | Knippel ............................ 414/387 |
| 4,291,631 | 9/1981 | Knippel ............................ 105/252 |
| 4,335,988 | 6/1982 | Marsden ........................... 414/387 |
| 4,339,222 | 7/1982 | Knippel ............................ 414/387 |
| 5,249,631 | * 10/1993 | Taylor ............................. 105/290 |
| 5,261,333 | * 11/1993 | Miller ............................. 105/240 |
| 5,263,422 | * 11/1993 | Barefoot ........................ 105/308.1 |
| 6,067,912 | * 5/2000 | Miller ............................. 105/240 |

OTHER PUBLICATIONS

Plate F Equipment Diagram for Limited Interchange Service; S–2032–7; Association of American Railroads, Technical Services Division—Mechanical Section. *Manual of Standards and Recommended Practices*, p. C–255 (Sep. 1, 1997).

Association of American Railroads, Mechanical Division, *Manual of Standards and Recommended Practices*, pp. C–11–19 through 25 and C–11–28 through 31 (Jun. 1, 1988).

* cited by examiner

Primary Examiner—S. Joseph Morano
Assistant Examiner—Robert J. McCarry, Jr.
(74) Attorney, Agent, or Firm—John W. Harbst

(57) ABSTRACT

A locking mechanism for releasably and positively locking a hinged door of a railroad hopper car in a releasably closed position or condition is disclosed. The locking mechanism for each hinged door on the hopper car includes a lock carried on the hopper car adjacent a discharge opening, a pivotal locking element carried by the discharge door and movable therewith into releasable but positive locking engagement with the lock when the door is swung into a closed position or condition, and a door release mechanism for controllably releasing the locking element from engagement with the lock thereby permitting the discharge door to swing to an open condition or position. When a series of doors are arranged in end-to end relation along a bottom of the car, the door release mechanisms for the discharge doors are operated substantially simultaneously thereby opening substantially an entire bottom of the hopper car. Furthermore disclosed is a discharge door design including top and bottom panels having a cavity therebetween extending across and along substantially the entire length of the discharge door.

63 Claims, 9 Drawing Sheets

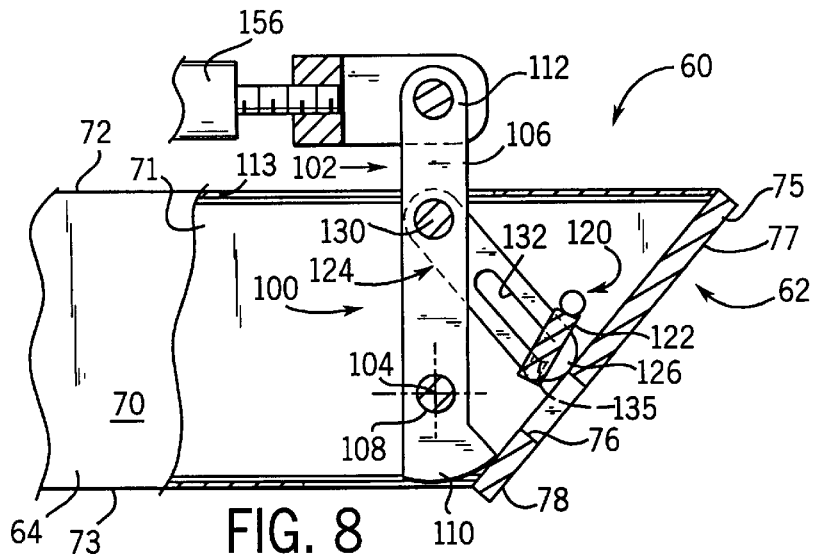
FIG. 8
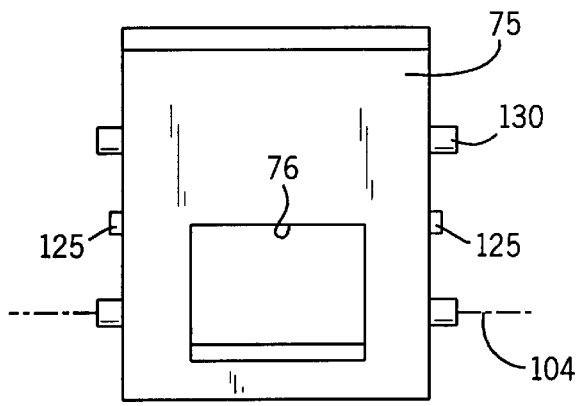
FIG. 9
FIG. 10
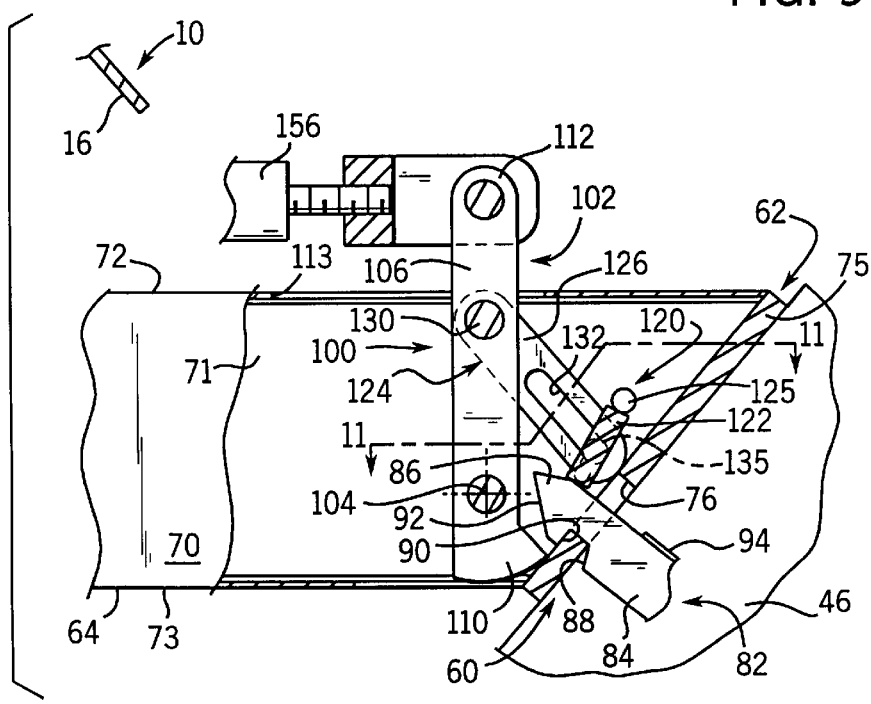

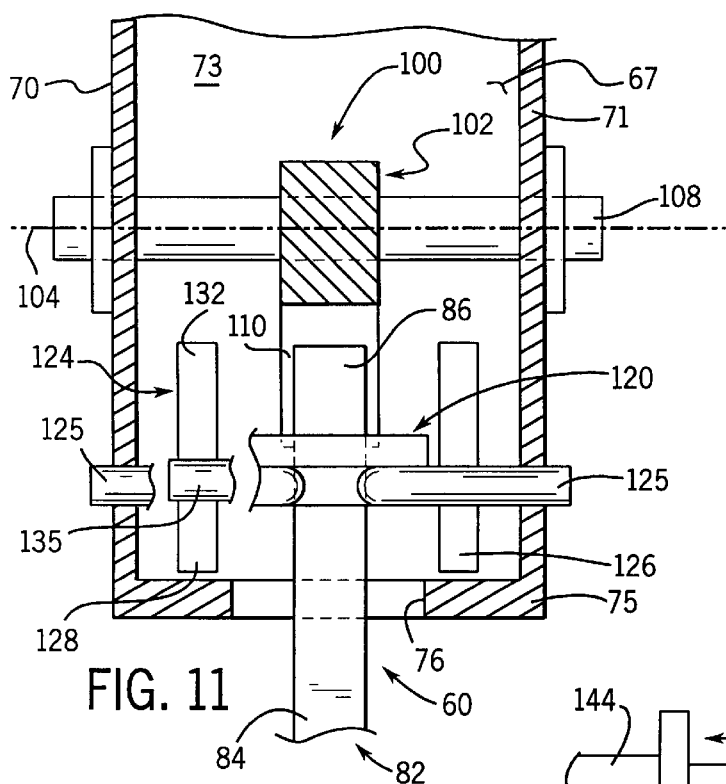
FIG. 11
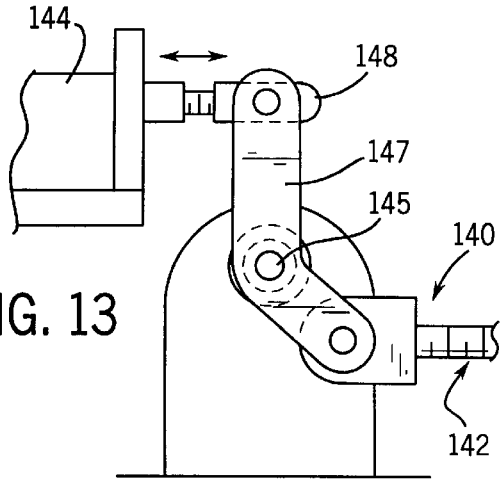
FIG. 13
FIG. 12
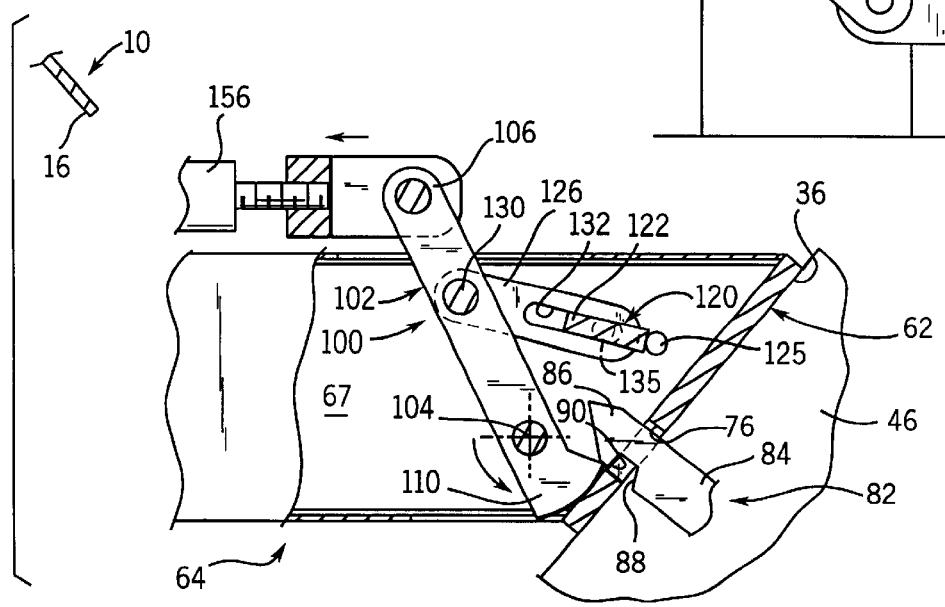

LOCKING MECHANISM FOR A HINGED RAILROAD HOPPER CAR DOOR

FIELD OF THE INVENTION

The present invention generally relates to railroad hopper cars and, more specifically, to a locking mechanism for releasably maintaining a hinged door of a railroad hopper car in a locked and closed position or condition.

BACKGROUND OF THE INVENTION

Basic railroad hopper car structures involve an elongated walled enclosure for holding particulate matter. The walled enclosed is typically mounted on a mobile underframe and the railroad car defines a longitudinal axis. It is well known for the walled enclosure of railroad hopper cars to be divided into a plurality of separated receiving compartments, such as four compartments or any desired number. A bottom of each compartment defined by the walled enclosure is usually provided with a series, typically one or more, of individual discharge openings arranged along and on opposite side of the longitudinal axis and through which particulate matter or ballast, held and transported within the walled enclosure, is to be discharged. Typically, the walled enclosure is provided with a series of slant sheets or slanted walls funneling downwardly toward each discharge opening to facilitate the discharge of the particulate matter from the car.

Various methods and devices are known in the art for individually closing the discharge openings disposed along the bottom of the hopper car. Basically, such closure devices are divisible into two categories. Some hopper cars utilize a sliding gate or valve type device for closing the discharge openings at the bottom of each compartment. Alternatively, some hopper cars are provided with hinged doors for controlling the discharge of particulate matter through the discharge openings.

A conventional slide gate device includes a frame which is bolted or otherwise secured to the hopper car. The frame defines a discharge opening arranged in operative combination with an opening at the bottom of the slanting walls on the hopper car. A gate is arranged on the frame for sliding movement between open and closed positions relative to a respective discharge opening. When open, the sliding gate permits the contents of the hopper car enclosure to pass gravitationally through the discharge opening defined by the frame of the gate assembly. When closed, the sliding gate shuts off the material or matter flow through the gate. Typically, the gate is driven between positions by imparting rotary movement to a rotatable operating shaft assembly. As will be appreciated by those skilled in the art, opposite ends of the operating shaft assembly are engagable by a power driven tool to forcibly move the gate between positions.

Although widely used throughout the railroad industry, conventional slide gate mechanisms require intense manual effort during an unloading operation. Moreover, the capability to quickly discharge materials through the opening in the frame of the gate assembly is somewhat limited with slide gate mechanisms. Accordingly, slide gate mechanisms are limited in their applications and uses Alternatively, hinged doors on other forms of railroad hopper cars are generally larger in size compared to the gate size afforded by slide gate mechanisms. As is well known in the art, the hinged doors are moved from their closed position to an open position by gravity upon the release of a locking mechanism. These hinged doors typically include an elongated generally flat steel plate which is hinged toward its upper edge or side to the hopper car. Various devices are known in the art for forcibly returning the doors from their open position to their closed position or condition.

In many railroad hopper cars, such doors are mounted transversely relative to a longitudinal axis of the railroad car. Research has revealed, however, transversely arranged doors on a railroad car offer a limited throat area through which material or ballast is discharged from the car.

Because of their larger size, the hinged doors on the hopper car have increased load levels placed thereon by the commodity held within the walled enclosure. The individual locking mechanisms typically provided in combination with and for holding the each door on the car in a releasably closed position includes components which are normally pushed during an unlocking operation. Thus, the component parts of each locking mechanism must be designed to not only withstand the increased load levels placed thereon by the ballast within the hopper but also the increased forces inherent with devices which are pushed rather than pulled. Notwithstanding the increased load levels placed thereupon, the locking mechanism for releasably holding the hinged door of a railroad hopper car in a closed position must operate with conciseness while maintaining sufficient strength and durability to sustain its continued operation in changing environments.

As will be appreciated by those skilled in the art, and as the railroad hopper car is transported across the country between destinations, the locking mechanism for releasably holding the side door of the hopper car in a closed position is subjected to dirt, dust, wetness, corrosion and a variety of changing environments. Yet, when the hopper car arrives at an unloading site, the locking mechanism is expected to operate in a manner permitting quick and easy unloading of the compartments of the hopper car.

Thus, there is a need and a desire for a positively operated locking mechanism for maintaining a hinged side door of a railroad hopper car in a releasably and locked closed position notwithstanding the environment and those inherent problems and rigid performance criteria associated with railroad hopper cars mentioned above.

SUMMARY OF THE INVENTION

In view of the above, and in accordance with the present invention, there is provided a locking mechanism for holding a hinged door of a railroad hopper car in a positively locked condition as long as the door is in a releasably closed position or condition. The hopper car with which the present invention finds utility includes an elongated mobile underframe extending longitudinally of the car and defining a longitudinal axis for the car. The railroad hopper car includes a hopper or walled enclosure mounted on the underframe and defining a series of compartments for receiving and holding commodity or particulate matter there within. Each compartment has one or more longitudinally disposed discharge openings toward the bottom thereof through which the ballast is discharged from the hopper car.

The discharge of material from the railroad hopper car through each discharge opening is controlled as a function of the open or closed position of a relatively large longitudinally mounted side door mounted for swinging movement relative to the discharge opening. In a preferred form of the invention, the side doors are longitudinally mounted in pairs to the hopper or walled enclosure of the railroad car. That is, each pair of discharge doors includes doors mounted to opposite lateral sides of the longitudinal axis of the hopper car for controlling discharge of particulate matter or material from the hopper car. In the illustrated form of the invention, each door is hingedly attached toward its upper edge to the hopper of the railroad car for swinging movement about a generally horizontal axis extending generally parallel to the longitudinal axs of the car. As such, the door swings downwardly and outwardly from a closed position toward an open position thereby increasing a throat area through which material or ballast is discharged from the hopper car.

As mentioned above, one of the salient features of the present invention relates to a locking mechanism for positively locking the hinged door of the hopper car in a releasably closed position. The locking mechanism for each discharge door on the hopper car comprises a lock carried on the hopper car adjacent the discharge opening, a pivotal locking element carried by the door and movable therewith into releasable but positive locking engagement with the lock when the door is in a closed position, and a door release mechanism for controllably releasing the locking element from engagement with the lock thereby permitting the door to swing to the open position. In a preferred form, the components of the locking mechanism are advantageously pulled during a door unlocking operation rather than pushed thereby allowing the design of the lock mechanism to be minimized and, thus, reducing the weight thereof In a most preferred form of the invention, the locking mechanism includes first and second locks carried on the hopper car adjacent opposite sides of the respective discharge opening and a pair of pivotal locking elements carried on each discharge door of the hopper car. Each locking element carried on the door is movable into releasable but positive locking engagement with one of the locks when the door is moved into a closed position. Moreover, a preferred form of the locking mechanism includes a pair of simultaneously driven door release mechanisms for controllably releasing the locking elements from engagement with their respective locks thereby permitting the door to swing toward an open position.

The locking element of each locking mechanism is preferably configured in the form of a lever pivotally connected toward one end to the door for rotation about an axis extending generally parallel to the axis about which the door swings between open and closed positions. The locking element extends generally normal to the door and has a free end extending from the door. Preferably, the locking element is biased to effect positive locking engagement with the lock on the hopper car when the door is moved into the closed position. In a most preferred form of the invention, a spring is arranged in combination with and biases the locking element into a positive locking engagement with the lock on the hopper car.

Each locking element of the locking mechanism is specifically designed to effect a positive locking relationship with the lock on the hopper car when the door is moved to the closed position. In the preferred form of the invention, each locking element or lock lever of the locking mechanism has a notch disposed toward a free end with an angled striker or cam surface leading to and disposed forwardly of the notch. The angled striker or cam surface on the locking element is configured to engage the lock on the hopper car so as to effect limited pivotal displacement of the locking element when the door is swung toward the closed position. When the door is in the closed position, the notch aligns with and cooperatively engages with the lock so as to effect a positive locking relationship therebetween. As will be appreciated, the notch defined by the locking element defines a shoulder or hook which positively engages with the lock to inhibit inadvertent release of the door from the closed position after the lock and locking element of each locking mechanism are arranged in locking engagement relative to each other. Of course, biasing the locking element into engagement with the lock furthermore serves to effect the positive locking relationship between the locking element and the lock when the door is swung into the closed position.

The lock of the locking mechanism preferably comprises an apertured member or plate on the underframe of the car. The apertured or hollow member preferably defines a stop for limiting swinging movement of the door from the open position and toward the closed position. Moreover, the apertured member is preferably accommodated within a recess defined between adjacent compartments defined by the walled enclosure or hopper on the railroad car.

Each door releasing mechanism of the locking mechanism includes an actuator which is rotates about a fixed axis. The axis about which the actuator rotates extends generally parallel to the axis about which the door swings between the open and closed positions. In the preferred form of the invention, the actuator of the door release mechanism advantageously includes an elongated arm or lever pivotally mounted between opposed ends thereof One end of the pivotal arm or link is movable along a path of travel which crosses with and engages a free end of the locking element when the locking element is in locking engagement with the lock. The pivotal movement of the actuator forcibly disengages or cams the locking element from engagement with the lock. As the locking element is moved to a released position, the weight on the door from the materials contained in the walled enclosure, as well as the weight of the door itself, swings the door to an open position.

As will be appreciated, the materials or ballast within the walled enclosure can place a significant downward force or load on the door. From an understanding of the door release mechanism of the present invention, it should be appreciated a significant mechanical advantage is realized by allowing the link or actuator of the release mechanism to pivot intermediate its ends and against a free end of the locking element along a surface disposed the furthest distance from the axis about which the locking element pivots. Thus, and notwithstanding the significant force or load on the door placed by the materials within the walled enclosure, the release mechanism is capable of effecting timely and efficient release of the door locking mechanism thereby permitting release of the materials from the walled enclosure in an expedient and efficient manner.

Another salient feature of the present invention relates to the apparatus used to actuate or operate the locking mechanism. The apparatus used to actuate or operate the locking mechanism includes a driver and linkage for individually connecting the driver to each locking mechanism on the hopper car. The driver of the operating apparatus can be either electrically powered or in the form of a fluidically operated cylinder.

The linkage for connecting the driver to each locking mechanism preferably comprises a controller which is pulled rather than pushed during a door unlocking operation. The controller is operably connected at one end to the driver. In a preferred form, the controller is reciprocally arranged for generally linear movement extending generally parallel to the longitudinal axs of the railroad car. In a most preferred form, the controller includes an elongated movable link supported for reciprocal movement on the underframe of the car. The elongated movable link is connected through laterally extending links to the actuator of each door release mechanism. As will be appreciated, when the controller is pulled linearly, the lateral links are pulled toward a center of the car thereby causing the actuators associated with each door release mechanism to rotate thereby effecting substantially simultaneous operation of the locking mechanism associated with each door on the railroad hopper car.

Still another salient feature of the present invention relates to the configuration of the side door used on the hopper car. In effect, the present invention discloses a hollow side door for a hopper car which is as strong as other heretofore known doors but has less weight thereby enabling the hopper car to carry more ballast or transport additional material within the walled enclosure.

In one form, the hinged door comprises a generally flat plate and an elongated bottom plate arranged in spaced but generally parallel relation relative to each other so as to define a cavity therebetween. In the illustrated form of the invention, such cavity preferably extends across and along the entire discharge door. A series of frame members are disposed within the cavity between the top and bottom plates to add strength, rigidity and torsional stiffness to the door. The cavity between the plates provides an advantageous structure for housing the pivotal end of each locking element associated with each locking mechanism of the present invention.

In a preferred form, each side door furthermore includes panel structure arranged in surrounding relation relative to the top and bottom plates for inhibiting dirt, and related debris from entering the cavity defined between the plates. Notably, the configuration of the door is such that the end profile of the hopper car conforms to AAR Standards. Moreover, the top and bottom plates are advantageously formed from aluminum to further reduce the weight of the each door and, thus, contributing to a reduction in the overall weight of the railroad car without detracting from its strength or carrying capacity.

Accordingly, one of the primary objects of this invention is to provide an improved, positive acting locking mechanism for a hinged door of a railroad hopper car offering improved reliability and efficiency in operation.

Another object of this invention is to provide an apparatus for actuating all the door locking mechanisms simultaneously thereby opening substantially an entire bottom of the railroad car through use of electricity or other forms of suitable drivers.

Another object of the present invention is to provide a door unlocking apparatus for a railroad hopper car which is operated in response to a pulling motion rather than a pushing motion thereby allowing the design of the component parts of the locking mechanism to be minimized.

Still a further object of this invention is to provide a substantially hollow door structure for a railroad hopper car, which door structure has less weight but is yet stronger and more rigid than other known comparable discharge door structures in the railroad industry.

These and other objects, aims and advantages of the present invention will become more readily apparent from the following detailed description, the appended claims and the drawings all forming an integral part of this disclosure.

DETAILED DESCRIPTION OF THE DRAWINGS

FIG. 8 is an enlarged partially sectioned view of the locking mechanism of the present invention;

FIG. 9 is a side view of the locking mechanism illustrated in FIG. 8;

FIG. 10 is a view similar to FIG. 8 but showing a side door in a closed relationship relative to the door locking mechanism;

FIG. 11 is a sectional view taken along line 11—11 of FIG. 10;

FIG. 12 is a view similar to FIG. 10 but showing the locking mechanism in a released condition;

FIG. 13 is an enlarged schematic representation of the area encircled in phantom lines in FIG. 1 illustrating a driver forming part of the locking mechanism of the present invention;

DETAILED DESCRIPTION OF THE PRESENT INVENTION

Figure 1:
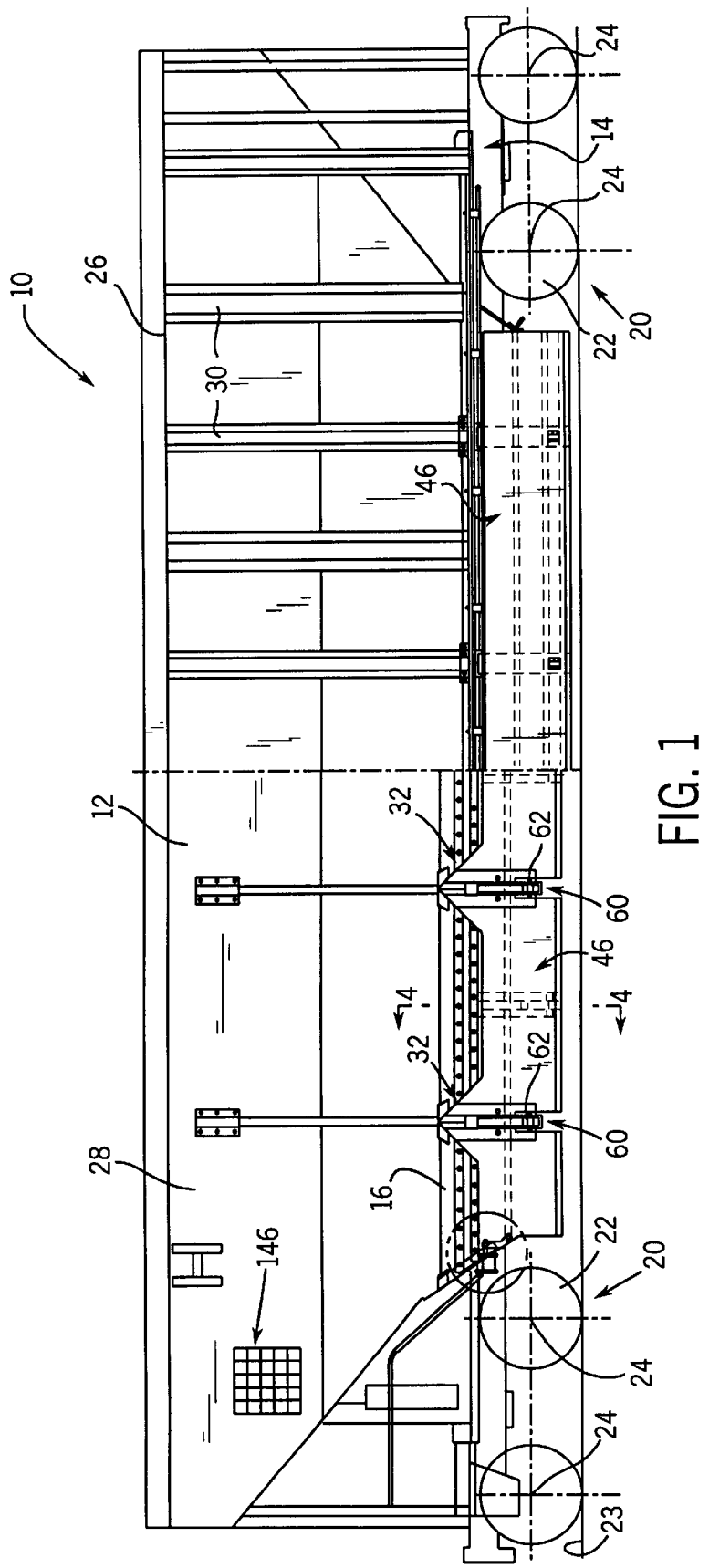
FIG. 1 is a side elevational view, partly in section, of a railroad hopper car embodying principals of the present invention.

While the present invention is susceptible of embodiment in various forms, there is shown in the drawings and will hereinafter be described a preferred embodiment of the invention with the understanding the present disclosure is to be considered as setting forth an exemplification of the invention which is not intended to limit the invention to the specific embodiment illustrated.

Referring now to the drawings, wherein like reference numerals indicate like parts throughout the several views, a railroad hopper car is schematically represented in the drawings by reference numeral 10. The hopper car 10 includes a multiwalled enclosure 12 for storing and transporting ballast or particulate matter there within. As is known in the art, the multiwalled enclosure or hopper 12 is supported on a mobile underframe 14 including a centersill 16 defining a longitudinal axis 18 (FIG. 2) for the railroad car 10. The underframe 14 including the centersill 16 extends generally the length of and generally parallel to the longitudinal axis 18 of the car 10. As is typical, the underframe 14 is supported toward opposite ends thereof by conventional wheeled trucks, generally designated in FIG. 1 by reference numeral 20. Each wheeled truck 20 preferably includes a pair of laterally spaced and flanged wheels 22 which turn about an axis 24 extending generally transverse to the longitudinal axis 18 of the railroad car and which ride on conventional tracks 23.

Figure 5:
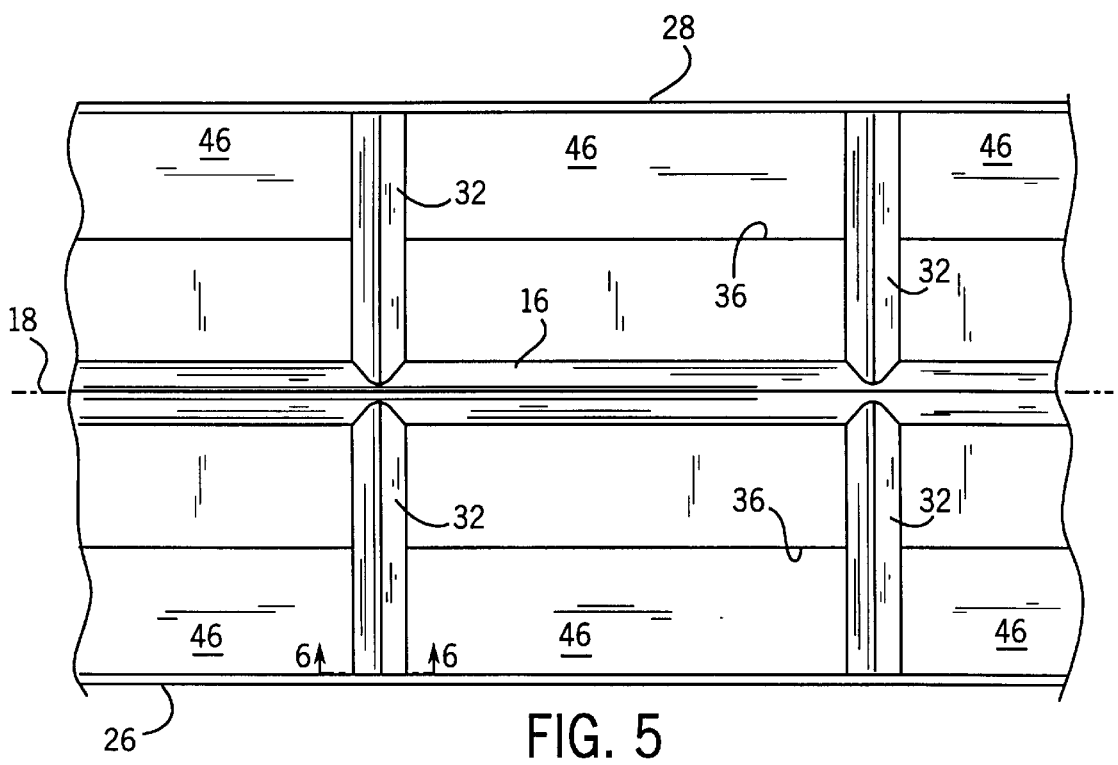
FIG. 5 is a partial top plan of a hopper forming part a walled enclosure defined by the railroad hopper car.

As illustrated, the hopper 12 has a generally rectangular configuration toward a top portion thereof and includes laterally spaced and generally parallel side walls 26 and 28. As known in the art, a plurality of vertical stakes or supports 30 are provided in combination with each side wall 26, 28 to add strength and rigidity thereto. An interior of the enclosure 12 is divided transversely by the centersill 16 and furthermore by longitudinally spaced and raised cross ridge partitions 32 (FIGS. 1 and 5). As illustrated, the cross ridge partitions 32 extend laterally away from the centersill 16 to opposite sides 26, 28 of the railcar 10.

Figure 3:
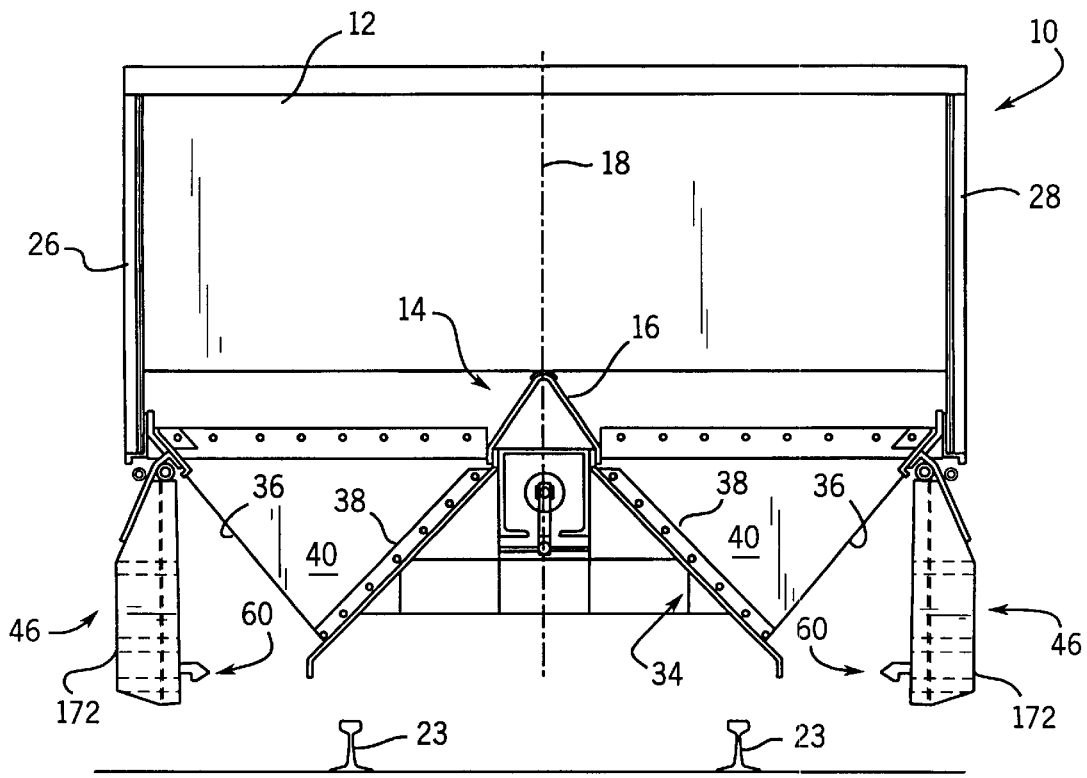
FIG. 3 is a schematic end view of the railroad hopper car similar to FIG. 2 with the side doors of the hopper car in an open position or condition.
Figure 4:
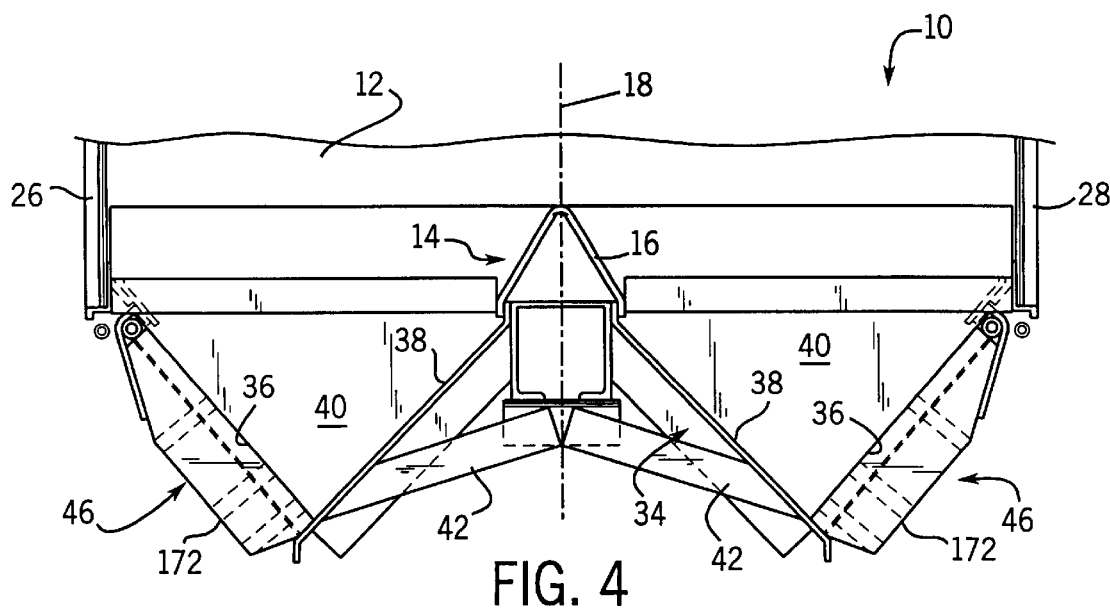
FIG. 4 is an enlarged sectional view taken along line 4—4 of FIG. 1.

As illustrated in FIGS. 3 and 4, a bottom 34 of the enclosure 12 is provided with longitudinally elongated discharge openings 36 for allowing ballast or particular materials to be discharged from the enclosure 12. The hopper or walled enclosure 12 is preferably configured with slanted slope sheets 38 and hopper walls 40 which define the discharge opening 36 at the lower ends thereof and which allow the ballast or material in the hopper 12 to be discharged downwardly and to a side of the railcar 10. In the illustrated form of the invention, the longitudinally elongated openings 36 are preferably arranged in pairs relative to each other on opposite sides of the centersill 16. As illustrated in FIG. 4, suitable braces or supports 42 laterally extend from the centersill 16 into supporting relation relative to the slope sheets 38 to add strength and rigidity thereto.

Figure 2:
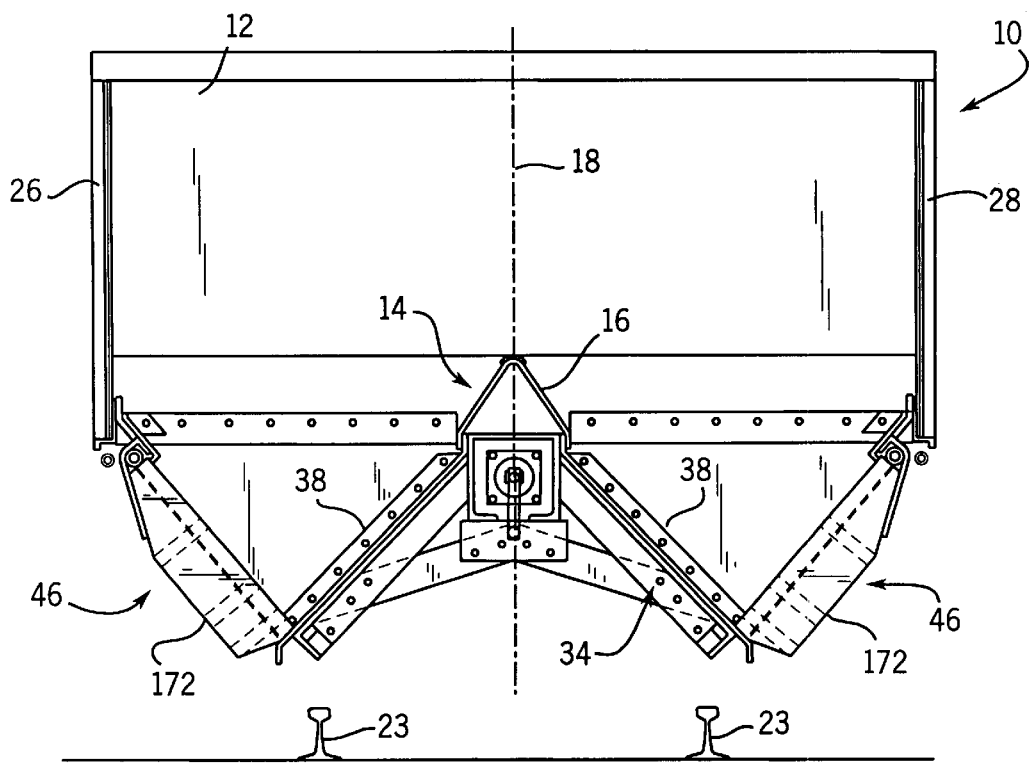
FIG. 2 is a schematic end view of the railroad hopper car illustrated in FIG. 1 with the side doors of the hopper car in a closed position or condition.

The flow or discharge of ballast or particulate matter from the hopper 12 through each discharge opening 36 is controlled by a door 46 movable between closed and open positions relative to a discharge opening 36. To enhance the throat area through which material is discharged from the hopper car, each door 46 is preferably mounted longitudinally relative to the car 10. When the door 46 is in a closed position, as illustrated in FIG. 2, the door 46 is in a vertically inclined disposition and is retained in such position by a door locking mechanism 60 (FIG. 3) according to the present invention. FIG. 3 schematically represents the doors 46 in their open position. As will be appreciated by those skilled in the art, the doors 46 move between the closed and open positions as a result of the downward gravitational flow of material from the hopper 12 and their own weight.

In the illustrated embodiment of the invention, each door 46 is hingedly mounted on the hopper 12 for movement relative to the respective discharge opening 36. In the illustrated embodiment, hinge structure 50, preferably including a pair of longitudinally spaced hinges 51 arranged toward an upper edge 52 of each door 46, allows for swinging downward and outward movement of the door 46 between closed and open positions. The hinges 51 of hinge structure 50 are preferably identical relative to each other. Accordingly, only one hinge will be discussed in detail.

Figure 6:
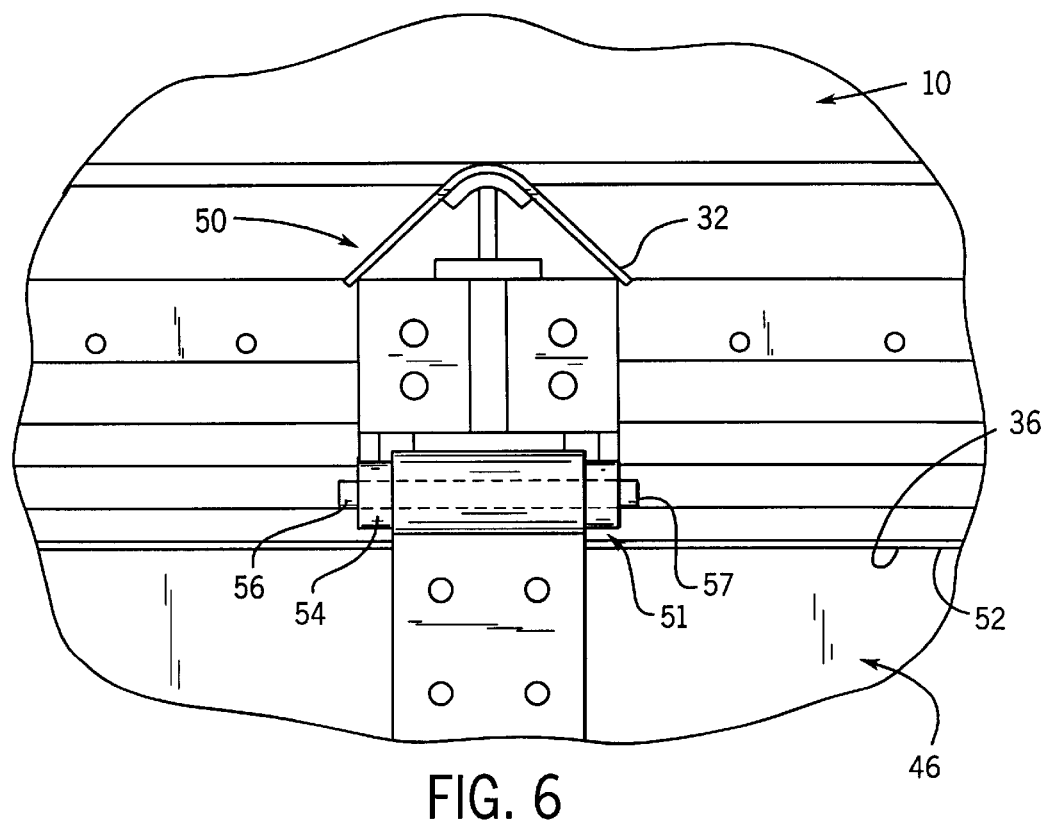
FIG. 6 is a sectional view taken along line 6—6 of FIG. 5.

As schematically represented in FIG. 6, each hinge 51 includes a hinge butt 54 secured to a side of the hopper car 10. The door 46 is hingedly connected to each hinge butt 54 as by a pivot pin 56 defining a pivot axis 57 for the door 46. In the illustrated embodiment, the pivot axis 57 for the door 46 extends generally horizontal and generally parallel to the longitudinal axis 18 (FIG. 2) of the railroad car 10.

It should be appreciated, however, other hinge structures for hingedly connecting the door 46 to the hopper car 10 would equally suffice without detracting or departing from the spirt and scope of the present invention. For example, the hinge structure for pivotally connecting the door 46 to the sides of hopper car 10 can equally include a double link hinge so as to allow the door 46 to move in a more lateral direction between open and closed positions. As will, be readily appreciated, the hinge structure can take many variations from that specifically illustrated for illustrative purposes and those discussed as alternative embodiments. Suffice it to say, each door 46 is hingedly connected to a side of the hopper car 10 by suitable hinge structure allowing the door 46 to move between open and closed positions relative to a respective discharge opening 36 in a manner controlling the discharge of ballast or particulate matter from the hopper 12 of the car 10.

Each discharge door 46 is releasably maintained in an inclined closed position by a locking mechanism 60 according to the present invention. As mentioned above, the discharge doors 46 on the hopper car 10 are preferably operated in pairs relative to each other. Moreover, each discharge door 46 is preferably provided with two locking mechanisms associated therewith primarily because of the longitudinally elongated configuration of each discharge door 46. In the illustrated form, and for simplicity purposes, each locking mechanism 60 for each discharge door 46 is substantially similar to the other. Accordingly, only one locking mechanism 60 will be described in detail with the understanding, at least with respect to the preferred embodiment of the invention, the other locking mechanism 60 on each discharge door 46 is substantially similar thereto.

Figure 7:
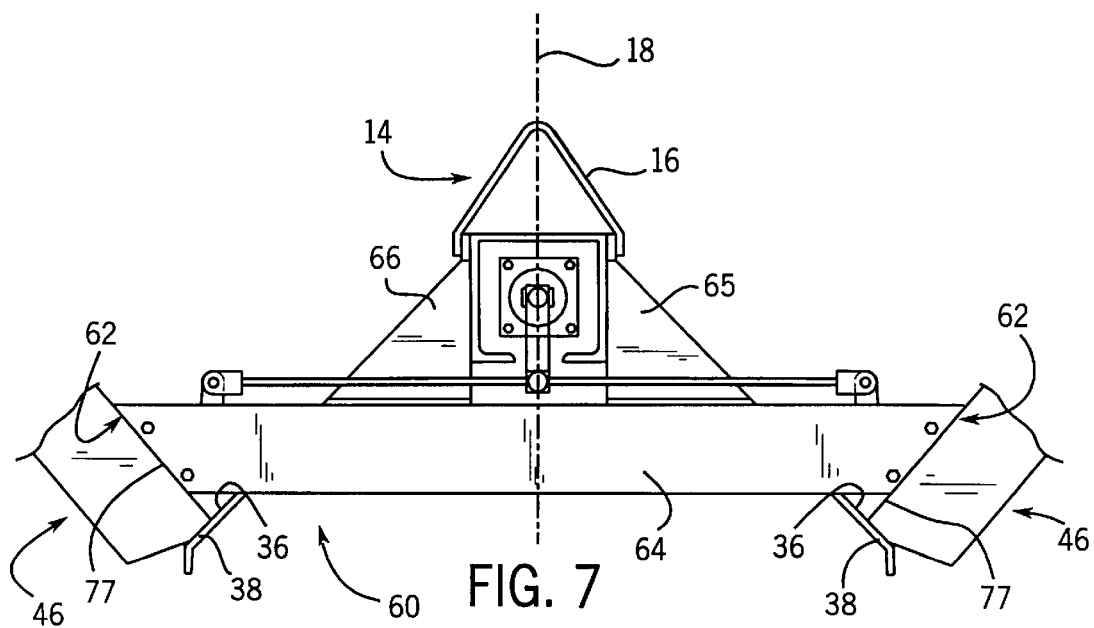
FIG. 7 is an enlarged side sectional view illustrating the door locking mechanism of the present invention.

According to a preferred form of the invention, and as illustrated in FIG. 8, each locking mechanism 60 includes a lock 62. In the illustrated form of the invention, and as shown in FIG. 1, the lock 62 of each locking mechanism 60 is preferably disposed adjacent one side of and outside of a discharge opening 36. In the embodiment illustrated for exemplary purposes, and as shown in FIGS. 7 and 8, each lock 62 of the locking mechanism 60 is preferably positioned adjacent a side of a respective discharge opening 36 as by an elongated member 64 extending generally normal to the longitudinal axis 18 of the hopper car 10. As shown, the elongated member 64 laterally extends to opposed sides of the centersill 16 of the hopper car 10. As illustrated in FIG. 7, each member 64 extends beneath and is connected to the centersill 16. In the illustrated form of the invention, suitable bracing 65 and 66 depends from the centersill 16 and rigidly supports and positions the elongated member 64 on the underframe 14 of the hopper car 10. In a preferred form of the invention, and as shown in FIG. 8, opposed ends of member 64 define an internal cavity 67 opening to the free end of member 64.

In a most preferred form of the invention, and to add strength and rigidity thereto without adding significant weight thereto, the elongated member 64 preferably has a hollow configuration between opposed ends thereof As shown in FIG. 8, at least each free end of member 64 is configured with longitudinally spaced and preferably parallel side walls 70 and 71 which are joined to each other by upper and lower generally parallel walls 72 and 73, respectively, to define the internal cavity 67 therebetween. Of course, it is well within the scope of the present invention that separate mounting brackets can be provided for each lock 62 thereby eliminating or replacing the elongated member 64 extending transversely across the car 10.

In the preferred form of the invention, and as illustrated in FIG. 9, each lock 62 includes an apertured plate or member 75 extending across and closing the cavity 67 (FIG. 8) defined by member 64. Plate 75 defines an aperture or opening 76 extending therethrough and preferably having a closed margin. As will be appreciated from an understanding of the present invention, each lock 62 can alternatively be structured as a suitably shaped bar or other member extending across the open end of member 64 and secured to the side walls 70 and 71 of member 64.

Returning to FIG. 8, each lock 62 furthermore defines a stop 77 for limiting movement of the door 46 as the door 46 is swung from the open position to a closed position. In the illustrated form, stop 77 is defined by a generally flat surface 78 on the apertured plate 75 which extends into the path of and impacts against the door 46 as the door 46 swings from the open position to the closed position.

Turning to FIG. 10, each locking mechanism 60 further includes a locking element 82 carried by each door 46 and movable into releasable locking engagement with the lock 62 when the discharge door 46 is swung into a closed position. As will be described in further detail below, the locking element 82 is configured as an elongated lever 84 mounted on the discharge door 46 for limited pivotal movement. As shown, lever 84 includes a hook-shaped free end portion indicated generally by reference numeral 86. As illustrated in FIG. 10, and considering the embodiment of the invention set forth for exemplary purposes, the hook shaped free end portion 86 of the locking element 82 is configured to project through the aperture 76 in plate 75 when the discharge door 46 is in a closed position.

The hook-shaped free end portion 86 of the locking element 82 is arranged and configured to positively interengage with the lock 62 of the locking mechanism 60 upon swinging of the door 46 to a closed position thereby releasably holding the discharge door 46 in a vertically inclined, closed and locked position or condition. As illustrated in FIG. 10, the locking lever 84 is provided with an open sided notch or channel 88 extending inwardly from one side of the lever 84. As will be appreciated from an understanding thereof, the notch or channel 88 is configured with a width equal to or greater than the width of the plate 75 in the area of the opening 76 defining the lock 62. Notch or channel 88 defines a shoulder 90 which fits over and moves into a positive locking relationship with the lock 62 for retaining the discharge door 46 in a closed and locked position. The free ended hook portion 86 of the locking element 82 is furthermore provided with an inclined striker face 92 which leads to the shoulder 90. The striker face 92 on the free end portion 86 of the locking element 82 is configured to engage the closed margin defining the aperture 76 in the plate 75 of the lock 62 so as to effect limited pivotal displacement of the lever 84 upwardly as the discharge door 46 is swung into a closed position. Once the door 46 is in a closed position, the shoulder 90 defined by notch or channel 88 aligns with the plate 75 thereby allowing the lever 84 to gravitationally fall over and into positive locking relationship with the lock 62 of the locking mechanism 60 thereby releasably holding the discharge door 46 in a closed position.

In a preferred form of the invention, the locking element 82 is biased into positive locking engagement with the lock 62. In the embodiment illustrated in FIG. 10, and as discussed in detail below, a spring 94 is preferably provided in combination with and biases the locking element 82 into a positive locking engagement with the lock 62 of the locking mechanism 60. As illustrated, spring 94 is configured and arranged to cause the locking lever 84 to snap into positive locking engagement with the lock 62 as soon as the shoulder 90 passes into an operative locking relationship with the lock 62. As such, the gravitational influence of the locking lever 84 along with the bias of the spring 94 continually pressing thereon causes the locking lever 84 to automatically move toward a locked relationship with the lock 62 of the locking mechanism 60 thereby maintaining the door 46 in a closed position.

The locking mechanism 60 of the present invention furthermore includes a door release mechanism 100 for controllably releasing the locking element 82 from its positive locking engagement with the lock 62 thereby allowing the door 46 to swing to an open position. As illustrated in FIG. 10, the door release mechanism 100 includes an actuator 102 for selectively engaging and moving the free end portion 86 of the locking lever 84 out of locked engagement with the lock 62. The actuator 102 of the door release mechanism 100 is rotatable about a fixed axis 104 extending generally parallel to the pivot axis 57 of the hinge structure 50 and the longitudinal axis 18 of the hopper car 10.

As will be appreciated by those skilled in the art, the actuator 102 of the door release mechanism can take a myriad of shapes to effect release of the locking lever 84 from engagement with the lock 62. In the preferred form of the invention, the actuator 102 includes an elongated lever arm 106 pivotally mounted between opposite ends thereof In the preferred form of the invention, and as illustrated in FIG. 11, the lever arm 106 is mounted within the cavity 67 defined at the free end of each elongated member 64 on a pivot shaft 108 defining axis 104. As shown, the pivot shaft 108 is supported at opposite ends by the side walls 70, 71 of the elongated member 64.

As shown in FIGS. 10 and 11, a lower portion 110 of the lever arm 106 is positioned beneath the hook-shaped free end 86 of the locking element 82. As schematically illustrated in FIG. 10, an upper portion 112 of the lever arm 106 extends upwardly through and beyond an elongated slot or opening 113 in the upper wall 72 of the elongated member 64. Notably, the length of the upper portion 112 of lever 106 is considerably greater than the length of the lower portion 110 of the lever 106. That is, the distance between the pivot axis 104 and the terminal end of the upper portion 112 of lever arm 106 is substantially greater than the distance between the pivot axis 104 and the terminal end of the lower portion 110 of lever arm 106. In a most preferred form of the invention, a ratio of approximately 3:1 is established between the length of the upper portion 112 of lever 106 as compared to the length of the lower portion 110 of lever 106. As such, a mechanical advantage is realized when the lever arm 106 is pivoted to effect release of the locking element 82 from the lock 62. As will be appreciated by those skilled in the art, and in view of the substantial load and forces imparted to the locked engagement of the lock 62 and the locking element 82 when the hopper 12 is loaded with particulate matter, the mechanical advantage realized through the unique design of the actuator 102 is beneficial regarding quick and efficient release of the locking mechanism 60.

In a preferred form of the invention, the door release mechanism 100 is furthermore designed to inhibit inadvertent release of the locking mechanism 60. As will be appreciated by those skilled in the art, as the railroad hopper car 10 is transported across the country multiple terrains and track conditions are encountered. As such, the locking mechanism 60 for releasably holding the door 46 in a closed relationship relative to a respective discharge opening 36 is submitted to various conditions and forces. In this regard, a stop 120 is preferably provided as part of each door release mechanism 100 for inhibiting inadvertent release of the locking mechanism 60. So as to not interfere with proper or intentional unlocking of the locking mechanism 60, the stop 120 of each door release mechanism 100 is configured to operate in timed relation relative to the release of the locking mechanism 60.

In a preferred form illustrated in FIG. 10, the stop 120 of the door release mechanism 100 includes a pivotally mounted lever or plate 122 which is positioned atop the hook-shaped free end portion 86 of locking lever 84 on a side thereof opposite from the notch or channel 88. In the illustrated form of the invention, the plate or lever 122 of stop 120 is preferably formed from steel or other suitable material having some weight which allows the plate 122 to readily move under the influence of gravity and remain in a set position notwithstanding movements of the railroad car across uneven terrain and the like. As shown in FIG. 10, after the locking element 82 and the lock 62 are arranged in positive locking relationship relative to each other, the lever or plate 122 of stop 120 is positioned to inhibit inadvertent pivotal movement of the locking lever 84 in a direction which could effect release of the locking mechanism 60.

The stop 120 is preferably designed to operate in timed relation relative to the door release mechanism 100. In the embodiment illustrated in FIGS. 10 and 11, operation of the stop 120 is regulated by a linkage 124. Linkage 124 is connected to and operated in response to movement of the actuator 102 of release mechanism 100. In the illustrated embodiment, linkage 124 includes a pair of spaced identically shaped arms 126 and 128 arranged on opposite sides of the actuator 102. One end of each arm 126, 128 is free to rotate about a shaft 130 carried by and extending laterally from an upper portion of the locking lever 84. Lower ends of the arms 126, 128 are operatively connected to the stop 120. As shown, the lower end of each arm 126, 128 is provided with a closed elongated slot 132.

In the illustrated form of the invention, the pivotally mounted lever or plate 122 of stop 120 has a lateral or lengthwise dimension generally equal to or slightly less than the distance between the depending and spaced arms 126, 128 of linkage 124. Proximate an upper free end or edge, the lever or plate 122 is provided with axially aligned pins or stub shafts 125 extending from the plate 122 in opposite linear directions. A free end of each stub shaft 125 is journalled for rotation about a fixed axis defined by axially aligned bores or openings defined by the side walls 70, 71 of the elongated member 64. The lower free end or edge of the lever or plate 122 of stop 120 extends over and across the free ended hook portion 86 of the locking elver 84 when the locking element 82 and the lock 62 are arranged in locking engagement relative to each other. As such, and as mentioned above, the stop 120 inhibits the notch or channel 88 on the locking lever 84 from inadvertently disengaging from the lock 62.

Intermediate the upper and lower edges thereof, the plate or lever 122 of stop 120 furthermore includes another pair of axially aligned pins or stub shafts 135 which extend away from the plate 122 in opposite linear directions. Each pin or stub shaft 135 passes through a respective slot 132 defined by each arm 126, 128. Moreover, and as shown in FIG. 10, one end of the elongated slot 132 defines a limit which serves to position the stop 120 relative to the locking lever 84. As will be appreciated by those skilled in the art, the elongated slot 132 defined by each arm 126, 128 readily allows the stop 120 to move upwardly through the slot 132 as the free ended hook portion 86 of the locking element 82 initially passes through the opening 76 into locking engagement with the lock 62. After the locking element 82 is arranged in locking engagement with the lock 62, the plate or lever 122 of stop 120 gravitationally returns to the position illustrated in FIG. 10 whereat the stop 120 is positioned to inhibit inadvertent disengagement of the locking mechanism 60.

Turning now to FIG. 12, and as will be appreciated from an understanding of the present invention, disengagement of the locking mechanism 60 is effected in a quick and efficient manner. To effect disengagement of the locking mechanism 60, the actuator 102 of the door release mechanism 100 is rotated about its fixed rotational axis 104. In the embodiment illustrated, rotation of lever arm 106 causes the lower portion 110 of the actuator 102 to move along a path of travel which crosses with and effects engagement of the free ended hook portion 86 of the locking element 82 thereby lifting and removing the shoulder 90 on the locking element 82 from engagement with the lock 62 thereby allowing the associated door 46 to swing outwardly relative to the discharge opening 36 and, thus, allowing discharge of materials from the hopper 12 FIG. 1).

As will be appreciated from a full understanding of FIG. 12, upon movement of the actuator 102, the linkage 124 simultaneously moves the stop 120 such that the stop 120 is no longer in position to interfere with movement of the locking element 82 to a released position. As discussed above, the arms 126, 128 of the linkage 124 are operably connected to the actuator 102. As such, when the actuator 102 is rotated to release the locking mechanism 60, the arms 126, 128 of linkage 124 rotate and effectively remove, as by pulling, the stop 120 from the position illustrated in FIG. 10 to the position illustrated in FIG. 12 whereat the stop 120 is inoperable to limit or restrict lifting movement of the locking lever 84 from engagement with the lock 62 of the locking mechanism 60.

In the illustrated embodiment, the door release mechanism 100 for each locking mechanism 60 of each discharge door 46 is preferably operated simultaneously relative to each other. Another salient feature of the present invention relates to a linkage mechanism 140 which preferably operates under tension rather than compression to operate each door release mechanism 100. In the illustrated form of the invention, linkage mechanism 140 includes a common actuator 142 provided for operating the door release mechanisms 100 (FIG. 10) on each locking mechanism 60. As schematically illustrated in FIG. 13, linkage mechanism 140 furthermore includes a selectively operated driver 144 operably connected to the common actuator 142. The selectively operated driver 144 can be either in the form of a fluid operated cylinder or an electrically operated motor. When the driver 144 is configured as an electrically driven motor, the railroad car 10 is preferably provided with a solar array panel 146 (FIG. 1) for providing a suitable source of electric power used to operate the motor 144. Suffice it to say, and as shown in FIG. 13, an operable end 148 of the driver 144 is operably connected to the common actuator 142 as through a bell crank lever 147 suitably mounted for rotation about a location 145 arranged on the railroad hopper car 10 (FIG. 1).

In the illustrated form, the operable end 148 of driver 144 is articulately connected to an upper end of the bell crank lever 147. The common actuator 142 is articulately connected to a lower end of the bell crank lever 147. As schematically illustrated in FIG. 13, the length of the upper portion of lever 147 is considerably greater than the length of the lower portion of lever 147. That is, the distance between the location 145 whereat the lever 147 is rotatably mounted to the railroad car and the location whereat the operable end 148 of driver 144 is articulately connected to the lever 147 is substantially greater than the distance between the location 145 whereat the lever 147 is rotatably mounted to the car and the location whereat the common actuator 142 is articulately connected to the lever 147. In a most preferred form, a ratio of approximately 3:1 is established between the length of the upper portion of lever 147 as compared to the length of the lower portion of lever 147. As will be appreciated, a mechanical advantage is therefor realized when the crank lever 147 is rotated to effect release of the locking mechanisms 60 used to maintain the doors in a closed condition or position.

Figure 14:
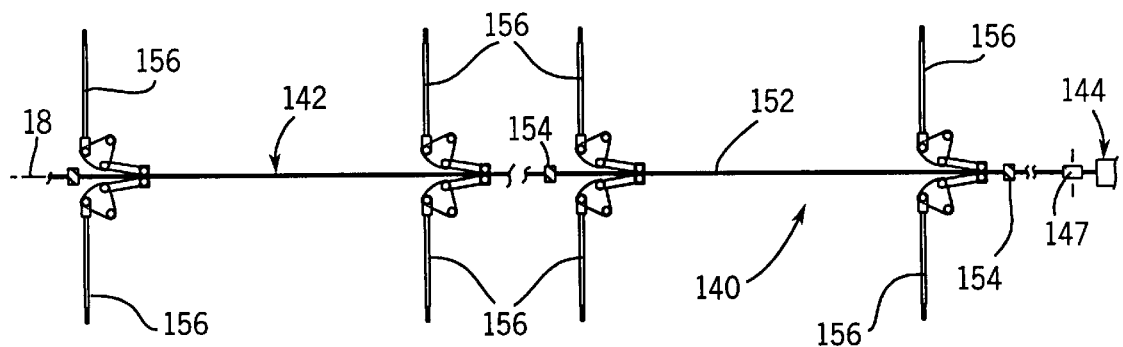
FIG. 14 is a bottom plan view of a linkage mechanism forming part of the locking mechanism of the present invention.

Turning to FIG. 14, the common actuator 142 for the linkage mechanism 140 is preferably configured as a longitudinally elongated link 152 preferably mounted to the underframe of the hopper car for reciprocal linear or endwise movement along a path of travel extending generally parallel to the longitudinal axis 18 of the hopper car 10. In the illustrated embodiment. suitable brackets 154 depending from the underframe of the hopper car support and guide the link 152 for linear movement in response to operation of driver 144. Laterally extending links 156, extending in opposite lateral directions from the elongated link 152, serve to interconnect the common actuator 142 with each actuator 102 of each door release mechanism 100 (FIGS. 10 and 12). Of course, with relatively slight redesign efforts to the present invention, the door release mechanisms 100 for each locking mechanism 60 can be independently operated in pairs relative to each other rather than simultaneously.

Figure 15:
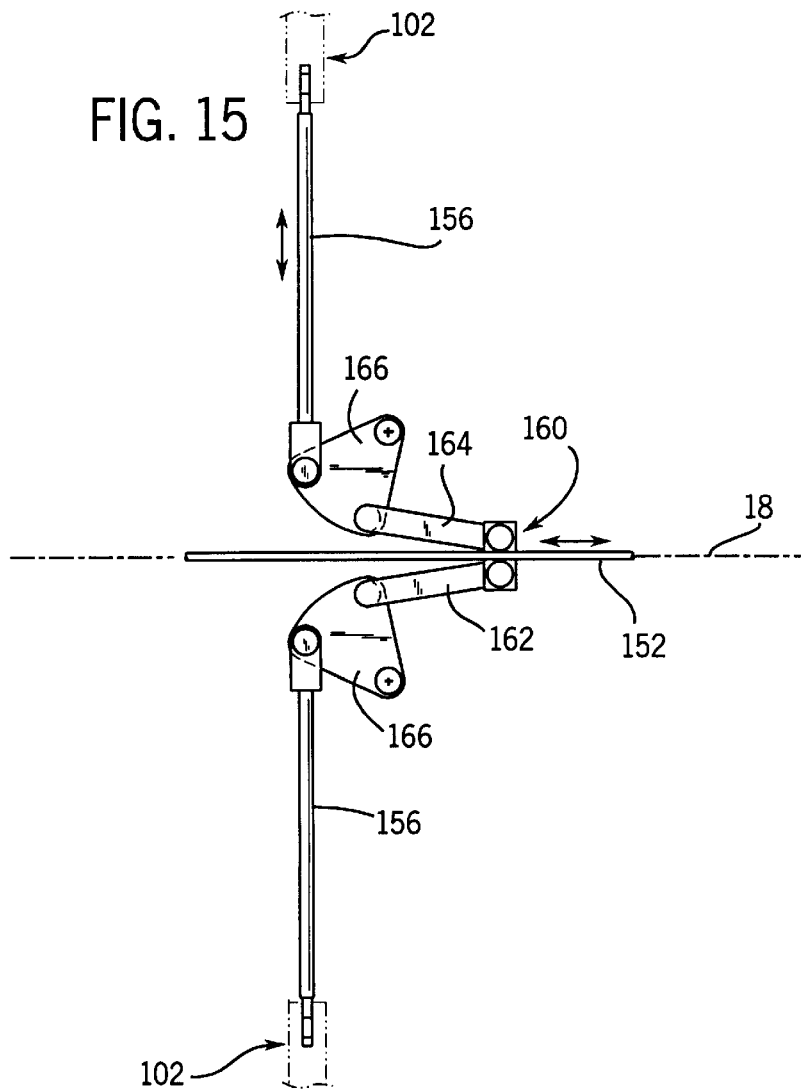
FIG. 15 is an enlarged bottom plan view of a portion of the linkage mechanism of the locking mechanism of the present invention.
Figure 16:
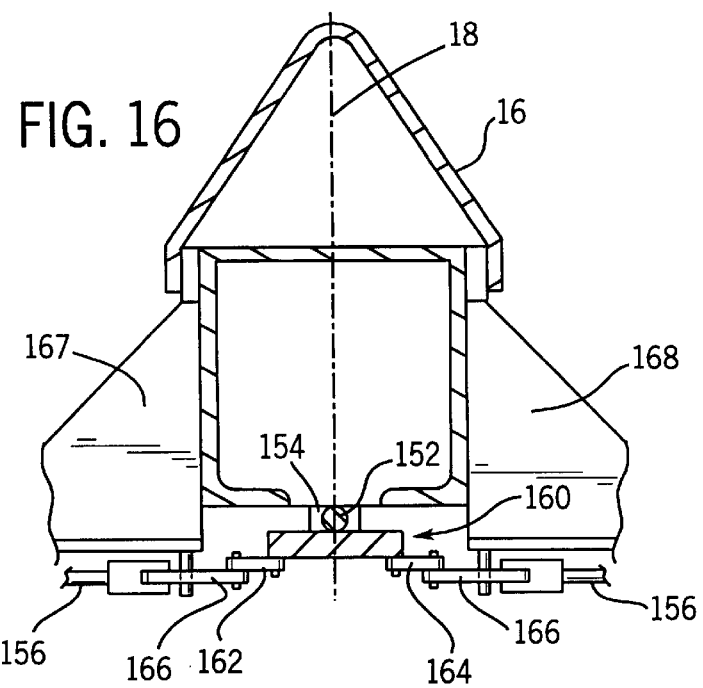
FIG. 16 is a sectional side view schematically illustrating the linkage mechanism mounted to an underframe of the railroad hopper car.

As illustrated in FIG. 14, the elongated link 152 of linkage mechanism 140 is operably connected to each of the lateral links 156 extending to the door release mechanisms 100 associated with each locking mechanism 60 for the discharge doors 46 on the railroad hopper car 10. One embodiment for operably interconnecting the main or elongated link 152 to the laterally extending links 156 is illustrated in FIGS. 15 and 16. As shown, and in the area from which the links 156 laterally extend away from the main or common elongated link 152, a connector 160 is fastened to and extends laterally to opposite sides of the elongated link 152.

Figure 17:
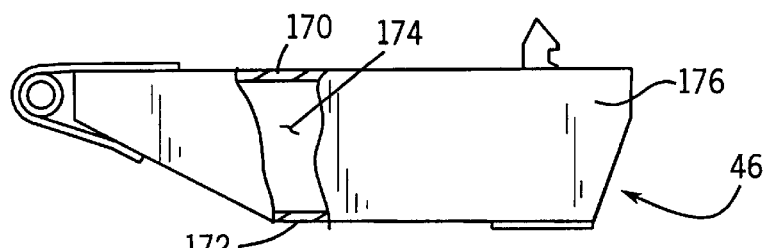
FIG. 17 is an enlarged end view of a side door used in combination with the present invention.
Figure 18:
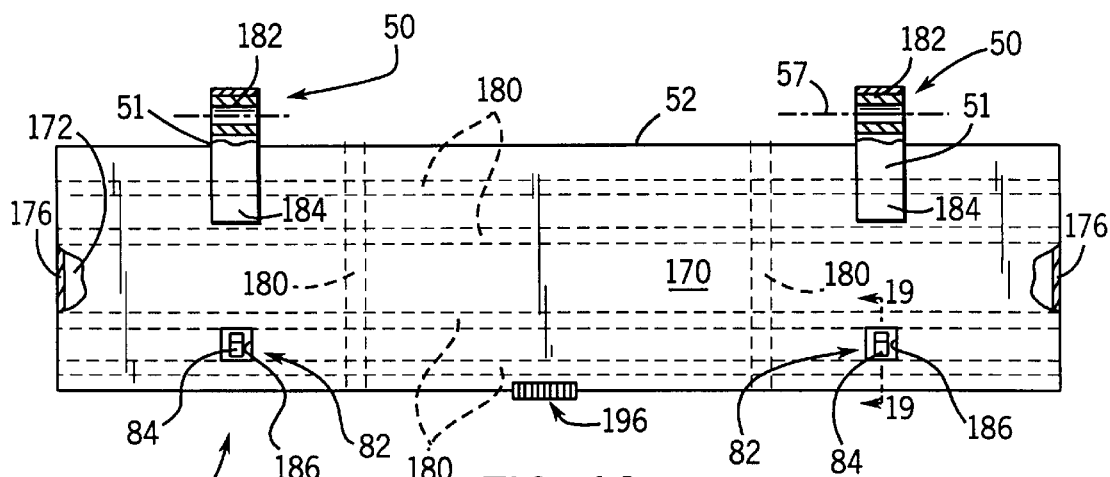
FIG. 18 is a top plan view of the side door illustrated in FIG. 17.
Figure 19:
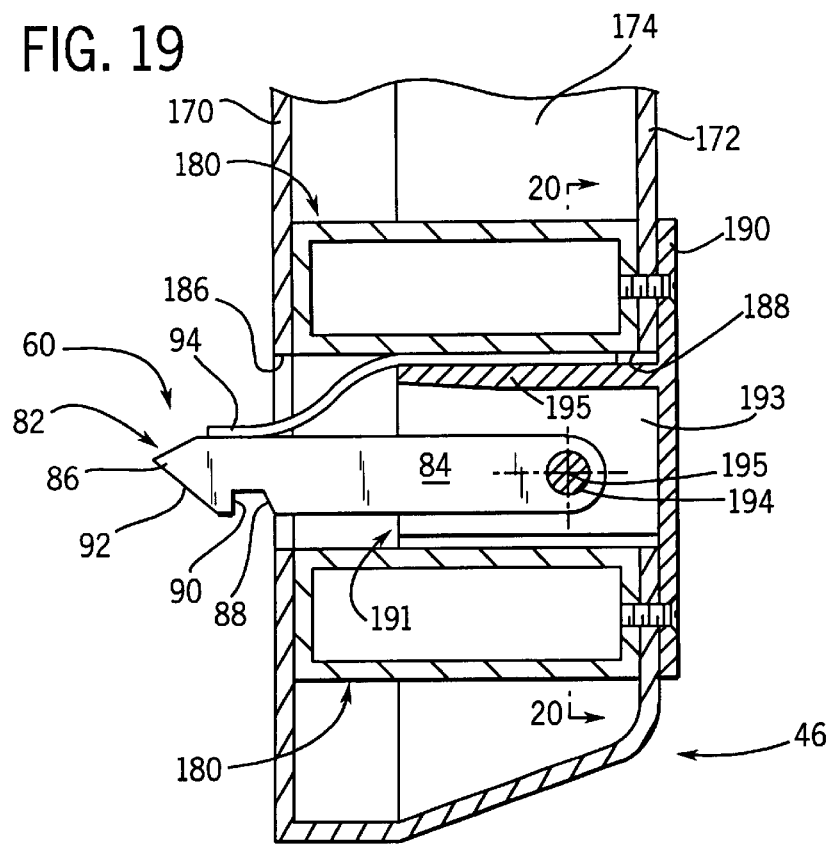
FIG. 19 is a sectional view taken along line 19—19 of FIG. 18.

From each connector 160, a pair of links 162, 164 longitudinally extend. One end of each link 162, 164 is articulately connected to the connector 160. An opposite end of each link 162, 164 is articulately connected to a bell crank lever 166 pivotally arranged on opposite sides of the main or control link 152. As illustrated in FIG. 16, each bell crank lever 166 can be articulated connected to supports 167 and 168 depending or projecting downwardly from but connected to the centersill 16. Each bell crank lever 166 is also connected to one end of a lateral link 156. As will be appreciated by those skilled in the art, the endwise movements of the main or control link 152 will be transferred into lateral movement of the lateral links 156 as through rotation of each bell crank lever 166. A spring 153 (FIG. 13) is provided to return the control link 152 to a preset position after the driver 144 is disabled. As will be appreciated, the spring 153 can take many different styles from that illustrated for exemplary purposes. Alternatively, the driver 144 can be configured with a spring return or as a double acting driver capable of positively positioning the control link 142 in either direction of travel Another feature of the present invention relates to the structure of each discharge door 46. According to a preferred form, each discharge door 46 comprises a generally hollow structure offering increased strength and rigidity while having less weight than other discharge doors of comparable size As illustrated in FIGS. 17 and 18, each discharge door 46 preferably comprises a top plate 170 and a bottom plate 172 arranged in generally parallel and spaced relation from the top plate 170 to define a cavity 174 therebetween. As schematically illustrated in FIGS. 18 and 19, a series of frame members 180 are arranged in the cavity 174 and are suitably secured to the top and bottom plates 170, 172 to add strength and rigidity to the door 46. Preferably, the top and bottom plates 170, 172 are formed from aluminum to reduce the overall weight of the door 46. Moreover, and as shown, the braces or frame members 180 are hollow in configuration to add strength and rigidity to the door 46 without significantly adding to the weight of the door 46.

In the illustrated embodiment, and as shown in FIGS. 2, 3 and 17, the bottom plate 172 of each door 46 is specifically configured with a distinctive profile. The profile provided on the bottom panel or sheet 172 of each door 46 allows the overall end profile of the railroad hopper car 10 to conform to AAR Stand when the door 46 is swung to an open position.

As shown in FIGS. 17 and 18, and as mentioned above, hinge structure 50 is arranged adjacent an upper edge 52 of each door 46. In the illustrated embodiment of the invention, the hinges 51 of the illustrated hinge structure 50 are axially aligned relative to each other. As shown, each hinge 51 further includes a bushing 182 carried by a metal strap 184 secured to the top and bottom plates 170 and 172 of the door 46.

As illustrated in FIG. 18, the top plate 170 defines a pair of axially aligned openings 186 through which the locking lever 84 of locking element 82 projects. Notably, the openings 186 are sized in a fore-and-aft direction so as to allow for limited pivotal displacement of the locking lever 86 in the manner discussed above.

Figure 20:
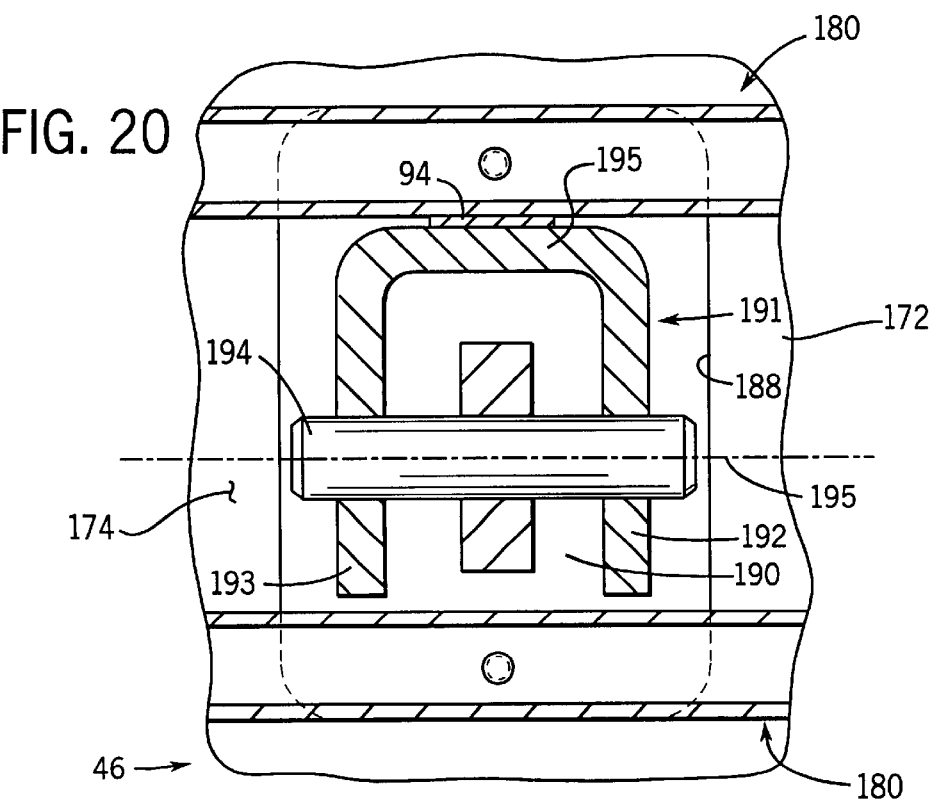
FIG. 20 is a sectional view taken along line 20—20 of FIG. 19.

Turning now to FIGS. 19 and 20, the lower or bottom plate 172 of each door 46 is also provided with a pair of openings 188 which are generally aligned with the openings 186 in the top or upper plate 170. As shown, the openings 188 in the bottom plate 172 allow for mounting of the locking lever 84 within the cavity 174 defined by each discharge door 46. In the illustrated form, an elongated mounting plate 190 extends across the entire length of the bottom plate 172 of each discharge door 46. Notably, the mounting plate 190 is considerably larger than the openings 186 defined in the bottom plate 172. Preferably, and for reasons discussed in detail hereinafter, the mounting plate 190 is preferably fabricated from steel or other reasonably strong wear resistant material.

As illustrated in FIGS. 19 and 20, a mounting bracket 191 projects from and is rigidly secured to the mounting plate 190. The mounting bracket 191 includes a pair of longitudinally spaced and generally parallel arms 192 and 193 which extend into the cavity 174 defined by each discharge door 46. As illustrated, opposite ends of a rockshaft 194 are journalled by the arms 192, 193 of the mounting bracket 191. The rockshaft 194 defines an axis 195 extending generally parallel to the pivot axis 57 (FIG. 6) defined by the hinge structure 50 and the longitudinal axis 18 of the railroad car 10. As shown, the locking lever 84 of each locking mechanism 60 is pivotally secured to the mounting bracket 191 through the rockshaft 194. As such, and as the door 46 is swung to a closed position or condition, the lever 84 of each locking mechanism 60 pivots as the striker face 92 engages with the lock 62 (FIG. 12) as the lever 84 protrudes through the opening 76 in plate 75.

In the illustrated form, the mounting bracket 191 furthermore includes an arm 195 disposed between and preferably connected to the arms 192, 193. Notably, arm 195 is sufficiently spaced from the locking lever 84 of each locking mechanism 60 as to not interfere with the pivotal movement of the locking element 82. In this form, and as schematically represented in FIG. 19, one end of the spring 94 used to bias the locking element 82 into locking engagement with the lock 62 is secured to the arm 195 of the mounting bracket 191.

Returning to FIGS. 17 and 18, each discharge door structure 46 further includes side panel structure 176 arranged in surrounding relation to the door 46 and in combination with the top and bottom panels or plates 170, 172 on the door 46. As will be appreciated, the side panel structure 176 serves to enclose the cavity 174 thereby inhibiting dirt, debris and related contaminants from entering the cavity 174. In the illustrated form of the invention, the side panel structure 176 is fabricated from aluminum to minimize the overall weight of each discharge door 46.

As schematically represented in FIG. 18, each discharge door 46 can further include seal structure 196 along the entirety of the longitudinal edge opposite from the hinge structure 50. As is conventional, the seal structure 196 operates in combination with the slope sheets 38 of the walled enclosure 12 when the door 46 is in a closed position to effectively seal the discharge openings 36. In the illustrated embodiment, the seal structure 196 preferably includes a conventional brush seal secured along the longitudinal edge of the door 46 opposite from the hinge structure 50.

While the railroad hopper car 10 is moving between destinations, the locking mechanism 60 of the present invention is in the position illustrated in FIG. 10. In this position, the shoulder 90 of each locking element 82 is in positive locking relationship relative to a respective lock 62 thereby maintaining the discharge door 46 in a releasably closed condition. In this position, and according to a preferred form of the invention, the stop 120 of the door release mechanism 100 is positioned in overlying relation to the hook-shaped free end portion 86 of each locking lever 84 thereby inhibiting inadvertent movement of the locking element 82 relative to the lock 62.

After the railroad car 10 reaches its destination, it is properly positioned along the tracks 23 for unloading. Notably, the longitudinal disposition of the discharge doors 46 along the bottom 34 of the car 10 increases the overall throat opening of the hopper car, as compared to hopper cars having transverse doors. As such, the design of the present invention promotes faster discharge of ballast with less likelihood of ballast "bridging" within the throat opening. Thus, by arranging the plurality of discharge doors 46 longitudinally of the car 10, almost the entire bottom of the car 10 can be open thereby the carrying capacity of the walled enclosure 12 is advantageously and significantly increased as compared to traditionally styled hopper cars.

After the railroad hopper car 10 is properly positioned along the tracks 23 for discharge of the ballast from within the enclosure 12, the driver 144 for operating the door release mechanisms 100 on each discharge door 46 is enabled through any suitable switch or the like (not shown) operably associated therewith. With the disclosed embodiment of the invention, when the driver 144 is enabled, the elongated control member 152 of linkage mechanism 140 is linearly pulled thereby causing lateral pulling movement of each link 156 toward the centersill 16 of the car 10 and in a substantially simultaneous motion. As discussed above, the linear endwise movement of the control member 152 of linkage mechanism 140 is converted to lateral movements of the links 156 as through pivoting movements of the bell crank levers 166. By pulling the control member 152 and the pulling of each lateral link 156 to release the locking mechanism 60, the component parts of the mechanism are placed in tension rather than compression. As such, and as will be appreciated by those skilled in the art, the links 156 used to effect movement of the locking mechanism 60 can be designed smaller than as if they were to be placed in compression and, thus, the entire or overall weight of the mechanism can be minimized without detracting from its effectiveness and operation.

Returning to FIG. 12, lateral movement of the links 156 of linkage mechanism 140 toward the centersill 16 of the railcar 10 effects rotational movement of the actuator 102 of each door release mechanism 100. In the illustrated form, lateral pulling movement of the links 156 of linkage mechanism 140 toward the centersill 16 of the railcar 10 effects pivotal displacement of each lever arm 106 about pivot axis 104. As will be appreciated from an understanding of the invention illustrated in FIG. 12, pivotal movement of the lever arm 106 of each door release mechanism 100 in response to lateral movement of the links 156 toward the centersill 16 of the car 10 forcibly causes the lower portion 110 of the lever arm 106 to engage and impart a camming action sufficient to forcibly lift the hook-shaped free end portion 86 of locking element 82 out of locked engagement with the lock 62 thereby releasing the positive locking relationship between the lock 62 and locking element 82 of the locking mechanism 60. After the locking element 82 is released from engagement with the lock 62, the positive locked relationship of the discharge door 46 and the hopper 12 is released whereupon the discharge door 46 is opened and the load within the hopper 12 is discharged. The opening movement of the discharge door 46 is provided by the weight of the ballast or lading within the hopper 12 against the door 46 thereby urging same to an open position.

As will be appreciated by those skilled in the art, the weight of the ballast or particulate matter on the longitudinally elongated door 46 is substantial. Accordingly, configuring the door release mechanism 100 of the present invention with an actuator 102 which rotates provides certain mechanical advantages related to releasing the positively locked relationship of the locking mechanism 60 in an efficient and effective manner. Preferably configuring the actuator 102 of the door release mechanism as an elongated lever arm 106 pivotally mounted between its opposed ends yields still further additional mechanical advantages when the door release mechanism is operated. In the illustrated embodiment, the 3:1 ratio provided by the elongated lever arm 106 advantageously allows quick and effective disengagement of the locking element 82 from the lock 62 of the lock mechanism 60 notwithstanding the significant weight placed upon the door 46 by the ballast within the hopper 12.

Configuring the crank lever 147 with a mechanical advantage furthermore aids in effective and efficient operation of each locking mechanism 60. In the illustrated embodiment, the 3:1 ratio provided by the lever 147 advantageously allows quick and effective disengagement of the locking element 82 from the lock 62 of each lock mechanism 60 notwithstanding the significant weight placed upon the door 46 by the ballast within the hopper 12.

As will be appreciated, the mechanical advantage provided by either the elongated lever arm 106 or the bell crank lever 147, and especially when those two advantageous designs are used conjointly, allows the locking element 62 to open relative to the stops 82 notwithstanding the positive locking relationship established therebetween, thus, promoting discharge of material from the hopper car 10. Of course, minimizing the weight and overall size of the mechanical components of the release mechanism furthermore promotes speedier and efficient operation of the locking mechanism 60 of the present invention.

Another advantageous feature of the present invention relates to the stop 120 preferably provided in combination with each door release mechanism 100. As discussed above, and according to a preferred form of the invention, the stop 120 is automatically removed from its overlying relation relative to the hook-shaped free end portion 86 of each locking lever 84 upon actuation of the door release mechanism 100. That is, in accordance with a preferred form of the invention, the stop 120 is operated in timed relation relative to rotation of the actuator 102 of the door release mechanism 100 so as to provide for efficient and unencumbered operation of the door release mechanism 100. In the illustrated form of the invention, the stop 120 is mechanically linked to the actuator 102 as through linkage 124 which removes the stop 120 in a controlled manner from the position illustrated in FIG. 10 to the position illustrated in FIG. 12 in response to rotation of the actuator 102. As such, and in the position illustrated in FIG. 12, the stop 120 is repositioned to readily allow the locking element 82 to be disengaged from the lock 62 of the locking mechanism 60.

With the present invention, actuation and pulling movement of the control link 142 of linkage 140 results in all of the pairs of discharge doors in the plurality of longitudinally elongated discharge doors to be opened substantially simultaneously to exhaust particulate matter from the enclosure 12. That is, rather than requiring operators to have to incur three or more separate operations on three or more different discharge doors, actuation and operation of the single driver 144 opens all the longitudinally elongated discharge doors 46 at substantially the same time. Thus, substantially the entire bottom 34 of hopper car 10 is opened at once to permit rapid discharge of materials from the enclosure 12. The entire contents of the hopper car 10, even though increased as a result of the advantageous design promoted by the longitudinal arrangement of the doors 46, is exhausted in less time than previously required to empty a hopper car with less capacity than that afforded by the advantageous design of the present invention. As will be appreciated from an understanding of the present invention, and in addition to being faster than heretofore known designs, the bottom dump door design of the present invention requires less manual efforts than with transverse door designs.

After the ballast is unloaded from the hopper 12 of car 10, the discharge doors 46 are returned to their closed positions or conditions. As will be appreciated by those skilled in the art, several different mechanism are well known in the art for moving the open discharge doors 46 to their closed position or condition. The majority of such door closing devices embody a roller or wheel (not shown) which rides along a flat bottom portion or surface of the door 46 in manner urging and swinging the door 46 upwardly into a closed position or condition.

With respect to the door 46 of the present invention, the mounting plate 190 arranged along substantially the entire length of the door 46 serves a dual purpose. First, and as described above, the mounting plate 190 serves as a base for each mounting bracket 191 of door locking mechanism 60 and on which the lock lever 84 is maintained. Because of the configuration of the mounting plate 190, the loads and forces imparted to the movable locking lever 84 from the ballast pressing downwardly on the door 46 are transmitted through the mounting bracket 191 and are advantageously dissipated or spread across a broadened area by the mounting bracket 190. Second, the mounting plate 190 serves as a contact area for the wheels or rollers of the door closing device. Because the mounting plate 190 is preferably fabricated from steel or the like, there will be limited wear incurred by the door 46 as the wheel or roller moves thereacross as the door 46 is swung to a closed condition or position.

As the door 46 swings and is forcibly moved toward a closed condition or position, the hook-shaped free end portion 86 of the lock lever 84 projects through the opening 76 in the plate 75 of the locking mechanism 60. As the hook-shaped free end portion 86 of the locking element 82 projects through the plate 75, the free end of locking lever 84 engages the stop 120 of the door release mechanism 100. As mentioned above, however, the stop 120 of the door release mechanism 100 is configured to freely rotate or pivot in a controlled fashion out of the path of the lever 84 as the locking element 82 is moved into locking engagement relative to the lock 62 of the locking mechanism 60. Moreover, and as the hook shaped free end portion 86 of the locking lever 84 projects through the plate 75, the striker face 92 of the lever 84 engages with the closed margin defined by the opening 76 in the lock 62 thereby pivoting and lifting the lock lever 86 about the pivot axis 195. As will be appreciated by those skilled in the art, the stop 77 on the bracket or elongated member 66 limits swinging travel or movement of the door 46 toward a closed condition or position.

After the door 46 reaches its closed position or condition, the shoulder 90 defined by notch or channel 88 is positioned in alignment with the lock 62 whereby the lever 84 returns the shoulder 90 of the locking element 82 into a positive locked relationship with the lock 62 of the locking mechanism 60. After the locking lever 84 falls into positive locked relationship with the lock 62, the stop 120 automatically returns to a position in overlying relation to the locking element 82 to inhibit inadvertent release of the locking mechanism 60 as the car 10 is transported thereby maintaining the discharge door 46 in a releasably closed condition or position. As discussed above, the spring 94 furthermore facilitates placement and return of the locking element 82 into a positive locked relationship with the lock 62 of the locking mechanism 60.

From the foregoing, it will be observed that numerous modifications and variations can be effected without departing or detracting from the true spirit and scope of the novel concept of the present invention. It will be appreciated that the present disclosure is intended to set forth an exemplification of the invention, which is not intended to limit the invention to the specific embodiment illustrated and described. The disclosure is intended to cover by the appended claims all such modifications and variations as fall within the spirit and scope of the claims.

What is claimed is:

1. A locking mechanism for a hinged door attached to a railroad hopper car such that said door moves outwardly from a closed position to an open position, said railroad hopper car having an underframe supported on wheels for movement over tracks, said hopper car further having a hopper supported on said underframe for holding particulate matter there within, said hopper defining a discharge opening relative to which said door moves between the open and the closed positions, said locking mechanism comprising:

a lock carried by said underframe;

a lock lever carried by said door for limited pivotal movement and movable into engagement with said lock to releasably hold and lock said door in the closed position; and a door release mechanism including an actuator rotatable about a fixed axis for urging said lock lever out of locked engagement with said lock thereby permitting said door to gravitationally move toward the open position from the closed position.

2. The hopper car door locking mechanism according to claim 1 wherein said lock lever is spring biased for effecting a positive locking engagement between said lock lever and said lock when said door is moved to the closed position from the open position.

3. The hopper car door locking mechanism according to claim 1 wherein said lock lever has an open sided notch and an angled striker surface disposed forwardly of said notch, said angled striker surface being configured to engage said lock so as to effect limited pivotal displacement of said locking lever when the door is swung toward the closed position to permit operative engagement between said open sided notch and said lock after said door is in the closed position.

4. The hopper car door locking mechanism according to claim 1 wherein said lock comprises an apertured member on the underframe of the railroad car and which defines a stop to limit movement of the door as said door is swung from the open position to the closed position.

5. The hopper car door locking mechanism according to claim 1 wherein said actuator of said door release mechanism comprises a driven member arranged to engage a free end of said lock lever when said lock lever is in locking engagement with said lock.

6. The hopper car door locking mechanism according to claim 1 wherein said locking mechanism further includes a selectively operable driver for moving said actuator of said door release mechanism so as to release said lock lever from engagement with said lock and thereby allow said door to swing toward the open position.

7. A locking mechanism for a hinged door closing a discharge opening defined by a railroad hopper car, said lock mechanism comprising:

a lock carried on said hopper car adjacent said opening;

a pivotal locking element carried by said door and movable therewith into engagement with said lock to releasably lock and hold said door is in a closed position; and a door release mechanism including an actuator rotatable about a fixed axis for controllably releasing said locking element from engagement with said lock thereby permitting said door to move toward an open position.

8. The hopper car door locking mechanism according to claim 7 wherein said locking element is biased to effect positive locking engagement between said locking element and said lock when said door is moved to the closed position from the open position.

9. The hopper car door locking mechanism according to claim 7 wherein said locking element has an open sided notch and an angled striker surface disposed forwardly of said notch, said angled striker surface being configured to engage said lock so as to effect limited pivotal displacement of said locking element when the door is swung toward the closed position to permit operative engagement between said open sided notch and said lock after said door is in the closed position.

10. The hopper car door locking mechanism according to claim 7 wherein said lock comprises an apertured member on the underframe of the railroad car and which defines a stop to limit movement of the door as said door is swung from the open position to the closed position.

11. The hopper car door locking mechanism according to claim 7 wherein said actuator of said door release mechanism comprises a driven member arranged to engage a free end of said locking element when said locking element is in locking engagement with said lock.

12. The hopper car door locking mechanism according to claim 7 wherein said locking mechanism further includes a selectively operable driver for moving said actuator of said door release mechanism so as to release said locking element from engagement with said lock and thereby allow said door to swing toward the open position.

13. The hopper car door locking mechanism according to claim 7 wherein said locking element comprises a lever pivotally connected toward one end to and extending generally normal to said door.

14. A railroad hopper car defining an elongated longitudinal axis and having a hopper defining a series of longitudinally extended openings disposed to opposite lateral sides of said longitudinal axis and through which ballast in said hopper car is discharged, a door carried on said railroad car in relation to each of said openings, with each door being movable between open and closed positions to control the discharge of ballast through a respective discharge opening, said door being hinged about a pivot axis disposed proximate an upper end of said door, in combination, a locking element carried on each door and pivotally movable about an axis which is fixed relative to said door and extends generally parallel to said pivot axis, with said locking element including a shoulder toward a free end thereof for releasably engaging and locking with a lock carried on said hopper car thereby positively maintaining said door in the closed position, and a door release mechanism including a driven actuator for selectively engaging and positively moving the free end of said locking lever so as to release said locking lever from locking engagement with said lock thereby allowing said door to gravitationally move toward an open position.

15. The hopper car door locking mechanism according to claim 14 wherein said locking element is biased to effect positive locking engagement between said locking element and said lock when said door is moved to the closed position from the open position.

16. The hopper car door locking mechanism according to claim 14 wherein said locking element has an open sided notch defining said shoulder and an angled striker surface disposed forwardly of said notch, said angled striker surface being configured to engage said lock so as to effect limited pivotal displacement of said locking element when the door is swung toward the closed position to permit operative engagement between said shoulder and said lock after said door is in the closed position.

17. The hopper car door locking mechanism according to claim 14 wherein said lock comprises an apertured member mounted on the underframe of said railroad car and which defines a stop to limit movement of the door as said door is swung from the open position to the closed position.

18. The hopper car door locking mechanism according to claim 14 wherein said driven actuator of said door release mechanism is rotatable and selectively engages a free end of said locking element when said locking element is in locking engagement with said lock.

19. The hopper car door locking mechanism according to claim 14 wherein said locking mechanism further includes a selectively operable driver for moving said actuator of said door release mechanism so as to release said locking element from engagement with said lock and thereby allow said door to swing toward the open position.

20. The hopper car door locking mechanism according to claim 14 wherein said locking element comprises a lever pivotally connected toward one end to and extending generally normal to said door.

21. A locking mechanism for a hinged door closing a discharge opening defined by a railroad hopper car, said lock mechanism comprising:
  a first lock carried on said hopper car adjacent one side of said opening;
  a second lock carried on said hopper car adjacent an opposite side of said opening;
  first and second pivotal locking elements carried by said door, each locking element being movable with the door into releasable locking engagement with one of said locks when said door is in a closed position thereby positively maintaining said door in the closed position; and
  first and second simultaneously driven door release mechanisms for controllably releasing said first and second locking elements from engagement with their respective locks thereby permitting said door to move toward an open position.

22. The hopper car door locking mechanism according to claim 21 wherein each locking element is biased to effect positive locking engagement between said locking element and said lock when said door is moved to the closed position from the open position.

23. The hopper car door locking mechanism according to claim 22 wherein each locking element has an open sided notch and an angled striker surface disposed forwardly of said notch, said angled striker surface being configured to engage a respective lock so as to effect limited pivotal displacement of said locking element when the door is swung toward the closed position to permit operative engagement between said open sided notch and said lock after said door is in the closed position.

24. The hopper car door locking mechanism according to claim 21 wherein each driven door release mechanism includes an actuator rotatable about a fixed axis for releasing said locking element from engagement with said lock and thereby allow said door to swing toward the open position.

25. The hopper car door latching mechanism according to claim 24 wherein the actuator of each door release mechanism comprises an elongated arm pivotally mounted between opposite ends thereof, with one end of said arm being movable along a path of travel which crosses with and engages a free end of said locking element when said locking element is in locking engagement with said lock.

26. The hopper car door locking mechanism according to claim 24 wherein said locking mechanism further includes a selectively operable driver which is individually and operably coupled to said actuator of each door release mechanism so as to release said locking elements from engagement with said locks and thereby allow said door to swing toward the open position.

27. The hopper car door locking mechanism according to claim 21 wherein each locking element comprises a lever pivotally connected toward one end to and extending generally normal to said door.

28. A locking mechanism for a hinged door closing a discharge opening defined by a railroad hopper car having a mobile underframe and an elongated longitudinal axis, said locking mechanism comprising:
  a lock carried on said hopper car adjacent said opening;
  a pivotal locking element carried by and connected to said door for movement therewith into engagement with said lock when said door is in a closed position to releasably hold and lock said door in the closed position; and
  a door release mechanism including a driven actuator rotatable about a fixed axis for controllably releasing said locking element from engagement with said lock thereby permitting said door to move toward an open position, said door release mechanism further including a stop for inhibiting said locking element from inadvertently releasing from locked engagement with said lock.

29. The hopper car door locking mechanism according to claim 28 wherein the said locking element is pivotally movable along a predetermined path of travel, and wherein said stop of said door release mechanism extends into the predetermined path of travel of said locking element as long as said locking element and said lock are in releasable locking engagement with each other thereby inhibiting inadvertent release of said locking element from said lock.

30. The hopper car door locking mechanism according to claim 28 wherein said actuator of said door release mechanism and said stop of said door release mechanism are connected to each other such that said stop and said locking element are operated in timed relation relative to each other when said door release mechanism is operated to allow said door to move toward the open position.

31. The hopper car door locking mechanism according to claim 28 wherein said pivotal locking element is biased to effect a positive locking engagement between said lock and said locking element when said door is moved to the closed position from the open position.

32. The hopper car door locking mechanism according to claim 28 wherein said lock comprises an apentured member on the underframe of the railroad car, said apertured member defining a limit to control movement of the door from the open position toward the closed position.

33. The hopper car door locking mechanism according to claim 28 wherein said locking element has an open sided notch and an angled striker surface disposed forwardly of said notch, said angled striker surface being configured to engage said lock to effect limited pivotal displacement of said locking element when the door is swung toward the closed position to permit operative engagement between the open sided notch on said locking element and said lock after the door is moved to the closed position.

34. The hopper car door locking mechanism according to claim 28 wherein said locking mechanism further includes a selectively operable driver for moving actuator of said door release mechanism so as to release said locking element from engagement with said lock and thereby allow said door to swing toward the open position.

35. The hopper car door locking mechanism according to claim 28 wherein said locking element comprises a lever pivotally connected toward one end to and extending generally normal to said door.

36. A locking mechanism for a longitudinally extended hinged door closing a longitudinally elongated discharge opening defined by a railroad hopper car, said lock mechanism comprising:
  a first lock carried on said hopper car adjacent one side of said discharge opening;
  a second lock carried on said hopper car adjacent an opposite side of said discharge opening;
  first and second locking elements carried by said door for movement about a pivot axis, each locking element being movable along a predetermined path of travel and with the door into releasable locking engagement with one of said locks when said door is in a closed position; and
  first and second simultaneously driven door release mechanisms for controllably releasing said locking elements from engagement with their respective locks thereby permitting said door to move toward an open position, with each driven door release mechanism including an actuator rotatable about a fixed axis extending generally parallel to said pivot axis and a stop for inhibiting a respective locking element from inadvertently releasing from locked engagement with the respective lock.

37. The hopper car door locking mechanism according to claim 36 wherein each locking element is biased to effect positive locking engagement between said locking element and said lock when said door is moved to the closed position from the open position.

38. The hopper car door latching mechanism according to claim 36 wherein the actuator of each door release mechanism comprises an elongated link pivotally mounted between opposite ends thereof, with one end of said link being movable along a path of travel which crosses with and engages a free end of said locking element when said locking element is in locking engagement with said lock.

39. The hopper car door locking mechanism according to claim 36 wherein the stop of each door release mechanism is connected to and simultaneously movable with said actuator for releasing said locking element out of locked engagement with said lock such that said stop moves in timed relation to rotation of said actuator.

40. The hopper car door locking mechanism according to claim 36 further including a selectively operable driver mounted on said hopper car and linkage for interconnecting said driver to each door release mechanism to effect operation of said door between the closed position and the open position.

41. A railroad hopper car defining an elongated longitudinal axis and having a hopper defining a series of longitudinally extended openings disposed to opposite lateral sides of said longitudinal axis and through which ballast in said hopper car is discharged, a door carried on said railroad car in relation to each of said openings, with each door being movable between open and closed positions to control the discharge of ballast through a respective discharge opening, said door being hinged about a pivot axis disposed proximate an upper end of said door, in combination, a locking mechanism operably associated with each door, each locking mechanism including a locking element carried on each door and pivotally movable about an axis which is fixed relative to said door and extends generally parallel to said pivot axis, with said locking element including a shoulder toward a free end thereof for releasably engaging and locking with a lock carried on said hopper car thereby positively maintaining said door in the closed position each locking mechanism further including a door release mechanism including a rotatably driven actuator for selectively engaging and positively moving the free end of said locking lever so as to release said locking lever from locking engagement with said lock thereby allowing said door to gravitationally move toward an open position; and wherein said locking mechanism is operably coupled to a linkage mechanism operated by a driver carried on said hopper car.

42. The railroad hopper car according to claim 41 wherein said linkage mechanism comprises a controller operably connected at one end to said driver and reciprocally arranged for generally linear movement extending generally parallel to the longitudinal axis of said railroad hopper car.

43. The railroad hopper car according to claim 42 wherein said controller comprises an elongated longitudinally movable link supported on the underframe of said railroad hopper car.

44. The railroad hopper car according to claim 42 wherein said linkage mechanism further includes a series of laterally movable links operably connected toward one end to said controller and operably connected to the rotatable actuator of each locking mechanism such that upon movement of said controller the rotatable actuator of each locking mechanism is rotated about its fixed axis.

45. The railroad hopper car according to claim 41 wherein the driver for said linkage mechanism comprises an electric motor.

46. The railroad hopper car according to claim 41 wherein the driver for said linkage mechanism comprises a fluidically operated cylinder.

47. The hopper car door locking mechanism according to claim 41 wherein each locikng element of said locking mechanism is biased to effect positive locking engagement between said locking element and said lock when said door is moved to the closed position from the open position.

48. The railroad hopper car according to claim 41 wherein said locking element of the locking mechanism has an open sided notch defining said shoulder and an angled striker surface disposed forwardly of said notch, said angled striker surface being configured to engage said lock so as to effect limited pivotal displacement of said locking element when the door is swung toward the closed position to permit operative engagement between said shoulder and said lock after said door is in the closed position.

49. The railroad hopper car according to claim 41 wherein each lock of said locking mechanism comprises an apertured member on the underframe of said railroad car and which defines a stop to limit movement of then door as said door is swung from the open position to the closed position.

50. The railroad hopper car according to claim 41 wherein each rotatable actuator of each door release mechanism comprises an elongated arm pivotally mounted between opposite ends thereof, with one end of said arm being movable along a path of travel which crosses with and engages a free end of said locking element when said locking element is in locking engagement with said lock.

51. The railroad hopper car according to claim 41 wherein said locking element comprises a lever pivotally connected toward one end to and extending generally normal to said door.

52. A locking mechanism for a hinged longitudinally elongated hollow door closing a discharge opening defined by a railroad hopper car, said hollow door comprising an elongated generally flat top plate and an elongated bottom plate arranged in generally parallel spaced relation relative to each other to define a cavity therebetween, with a series of frame members disposed in said cavity between said top and bottom plates to add strength and rigidity to said door, and wherein said locking mechanism includes an elongated locking element pivotally connected between said top and bottom plates and extending outwardly from and generally normal to said top plate for releasable locking engagement with a lock disposed on said hopper car.

53. The locking mechanism according to claim 52 wherein said hollow door further includes panel structure connected to and in surrounding relation relative to said top and bottom plates for inhibiting dirt, dust and other debris from entering said cavity defined between said top and bottom plates.

54. The locking mechanism according to claim 52 wherein said top and bottom plates are formed from aluminum to reduce the overall weight of said door.

55. A locking mechanism for a hinged door member closing a discharge opening in a hopper member comprising: a locking element mounted for united relative pivoting about an axis extending generally parallel to a longitudinal axis of one of said members, with said locking element including a shoulder toward a free end thereof for releasably engaging and locking with a lock fixed on said other member when said door is moved from an open position to a closed position thereby positively maintaining said door in the closed position, and a door release mechanism including a driven actuator for selectively engaging and positively moving the free end of said locking lever so as to release said locking lever from locking engagement with said lock thereby allowing said door to gravitationally move toward an open position.

56. The locking mechanism according to claim 55 wherein said locking element is biased to effect positive locking engagement between said locking element and said lock when said door member is moved to the closed position from the open position.

57. The locking mechanism according to claim 55 wherein said locking element has an open sided notch defining said shoulder and an angled striker surface disposed forwardly of said notch, said angled striker surface being configured to engage said lock so as to effect limited pivotal displacement of said locking element when the door member is swung toward the closed position to permit operative engagement between said shoulder and said lock after said door member is in the closed position.

58. The locking mechanism according to claim 55 wherein said lock comprises an apertured plate mounted on an underframe of said hopper member and which defines a stop to limit movement of the door member as said door member is swung from the open position to the closed position.

59. The locking mechanism according to claim 55 wherein said driven actuator of said door release mechanism comprises a lever arm pivotally mounted between opposite ends thereof, with one end of said lever arm being movable along a path of travel which crosses with and engages a free end of said locking element when said locking element is in locking engagement with said lock.

60. The locking mechanism according to claim 55 further including a selectively operable driver for moving said driven actuator of said door release mechanism so as to release said locking element from engagement with said lock and thereby allow said door member to swing toward the open position.

61. The locking mechanism according to claim 55 wherein said locking element comprises a lever pivotally connected toward one end to and extending generally normal to said door member.

62. The locking mechanism according to claim 55 wherein said door release mechanism further includes a stop for inhibiting said locking element from inadvertently releasing from locked engagement with said lock.

63. The locking mechanism according to claim 62 wherein the stop of said door release mechanism is connected to and moves in timed relation relative to movement of said actuator when said actuator is operated to release said locking element from locked engagement with said lock thereby allowing said door member to move from the closed position to the open position.

* * * * *